(12) United States Patent
Hill et al.

(10) Patent No.: US 7,333,991 B2
(45) Date of Patent: Feb. 19, 2008

(54) DIGITAL DESIGN AND MAINTENANCE SYSTEM AND METHOD

(75) Inventors: Todd Vander Hill, Long Beach, CA (US); Joe Bellasperanza, Lancaster, CA (US)

(73) Assignee: Todd E. Vander Hill, Garden Grove, CA (US)

( * ) Notice: Subject to any disclaimer, the term of this patent is extended or adjusted under 35 U.S.C. 154(b) by 0 days.

(21) Appl. No.: 10/212,441

(22) Filed: Aug. 5, 2002

(65) Prior Publication Data

US 2004/0024788 A1    Feb. 5, 2004

(51) Int. Cl.
*G06F 17/30* (2006.01)

(52) U.S. Cl. .................. 707/100; 707/3; 707/100; 707/104.1; 707/102

(58) Field of Classification Search ........... 707/100, 707/102, 10, 3; 715/500, 513, 514; 705/26, 705/27, 8–9
See application file for complete search history.

(56) References Cited

U.S. PATENT DOCUMENTS

| | | | |
|---|---|---|---|
| 4,943,919 A | 7/1990 | Aslin et al. | |
| 5,918,233 A | 6/1999 | LaChance et al. | |
| 6,006,171 A | 12/1999 | Vines et al. | |
| 6,038,610 A * | 3/2000 | Belfiore et al. | 709/300 |
| 6,125,312 A | 9/2000 | Nguyen et al. | |
| 6,208,955 B1 | 3/2001 | Provan et al. | |
| 6,209,007 B1 * | 3/2001 | Kelley et al. | 715/513 |
| 6,336,053 B1 | 1/2002 | Beatty | |
| 6,345,257 B1 | 2/2002 | Jarrett | |
| 6,370,454 B1 | 4/2002 | Moore | |
| 6,374,195 B1 | 4/2002 | Li et al. | |
| 6,401,077 B1 * | 6/2002 | Godden et al. | 705/26 |
| 6,470,383 B1 * | 10/2002 | Leshem et al. | 709/223 |
| 6,609,108 B1 * | 8/2003 | Pulliam et al. | 705/27 |
| 6,763,496 B1 * | 7/2004 | Hennings et al. | 715/501.1 |
| 2001/0032149 A1 * | 10/2001 | Fujiwara | 705/26 |
| 2002/0082893 A1 * | 6/2002 | Barts et al. | 705/8 |
| 2003/0055812 A1 * | 3/2003 | Williams et al. | 707/1 |
| 2004/0054554 A1 * | 3/2004 | Barts et al. | 705/1 |
| 2006/0161535 A1 * | 7/2006 | Holbrook | 707/3 |

* cited by examiner

*Primary Examiner*—Cam Y T Truong
(74) *Attorney, Agent, or Firm*—The Webb Law Firm

(57) ABSTRACT

A web-based plant maintenance system and method for organizing, retrieving, and displaying information relevant to plant maintenance which utilizes a database and a software application. Information relevant to plant maintenance is stored in the database. The software application utilizes the information to create a hierarchy of pages capable of being viewed in a web-browser. An end user can then access the appropriate page by navigating through the hierarchy, or by associating the web pages with design entities in a computer-aided drafting model.

11 Claims, 32 Drawing Sheets

COMMON PAGE GENERATION ACTIVITIES

DIGITAL DESIGN AND MAINTENANCE SYSTEM AND METHOD

BACKGROUND OF THE INVENTION

1. Field of the Invention

This invention relates generally to the field of plant design and maintenance and, more particularly, to a software program that allows a user to easily view and modify information relevant to the maintenance of equipment in the plant.

2. Description of the Prior Art

Proper maintenance of a plant and its equipment is a time-consuming operation that involves much paperwork. If a piece of machinery is in need of maintenance or repair, many documents relevant to that machine may be needed. These documents include technical drawings from the engineering department, a bill of materials, field notes regarding prior maintenance issues, product description, maintenance manuals, etc. Retrieving the above documents can require many phone calls and e-mails, traveling to different offices, and searching through thousands of files. Some of the relevant documents may no longer be available, such as field notes from a maintenance employee who has left the company.

The electronic maintenance systems that do exist function only to inform the user when maintenance is required. The user then has the responsibility to find the documents required for maintenance. Prior art also does not have the capability to link maintenance software to design software, which would allow a user to click on equipment in the design software in order to retrieve maintenance information relative to that equipment.

Finally, electronic prior art systems are not designed to be web-based. Maintenance information is stored on a central database and then downloaded to a computer connected to that central database. The user can view the information relative to maintenance in this embodiment, but not modify or update maintenance issues as changes can only be made directly to the central database.

A software program which quickly and easily makes available all documentation relevant to a piece of equipment would decrease the time and expenditures now necessary for proper maintenance of equipment. The software should make the documents accessible to end users using an internet browser, and allow maintenance information to be updated by the end user. The software should also have the capability to be linked to plant design software in order to enter relevant documents while the plant is being designed.

SUMMARY OF THE INVENTION

A web-based digital maintenance system organizes and displays information relevant to plant maintenance on pages that are viewable in a web browser. In this invention, the term "web-based" means that the pages can be accessed through the use of a server. The web-based system can be created to be available to an end user on the worldwide web, or on an internal server, or through the combination of the worldwide web and an internal server. The system comprises a database, a software application, and web pages. The database is used to store information relevant to plant maintenance, and the software application accesses the database to create the pages. The pages display information relevant to plant maintenance and each page contains links to other pages that likewise display information relevant to plant maintenance.

The pages consist of two different types: gateway pages and document list pages. Gateway pages are pages that display particular plant entities, types of documents regarding the entities, and associations with other plant entities. Document list pages are pages that display lists of a certain types of documents. A particular type of document, such as technical drawings or elevation drawings, will be displayed upon the selection of a hypertext link in a document list page.

The database in the system is created in such a way to allow the user, through the software application, to identify associations between plant entities. The database structure also allows the user, through the software application, to create the pages so that each page will contain links and maintenance information relevant to a corresponding plant entity. The information in the database that the software accesses includes images of plant entities, technical drawings, maintenance manuals, assembly instructions, field notes, purchase orders, elevation drawings, supplier documents, fabrication drawings, supplier web site locations, plant entity names and numbers, and associations between plant entities.

The information stored in the database is generally associated with one or more of the following plant entities: a model of machinery; a unit of one of the models; a piece of equipment from one of the units; a piping line from one of the units; a component from a piece of equipment; a piping part from one of the piping lines. This organization of plant entities allows the web pages to be arranged to link to one another in a hierarchical manner from a broad entity to a more specific entity.

The present invention can also be incorporated with a model of a plant created in a computer-aided drafting software application. By associating plant entities within the model to web pages, a user can enable a page containing maintenance information regarding a particular entity by selecting the image of that entity within the model. A user can also enable a page containing maintenance information regarding a particular entity by using a software tree. The user would associate nodes of the tree to particular pages containing information regarding plant maintenance. The tree nodes would depict particular plant entities and, upon the selection of one of the nodes, a page depicting maintenance information regarding the particular plant entity would be displayed. Furthermore, a user could associate a software tree with a model of a plant created in a computer-aided drafting software application and pages displaying information relevant to plant maintenance. Nodes of the tree would be associated with particular entities within the model and the plant. The user could select an entity within the model, which would expand the software tree to a node corresponding to the selected entity. Upon the selection of the node, a page displaying maintenance information regarding the selected entity would be displayed.

Using the present invention there are various methods for a user to obtain the display of a particular page containing information regarding plant maintenance for a desired plant entity. First, the user could navigate through a hierarchy of pages. The user would reach the page containing maintenance information regarding the desired plant entity by selecting links from a broad page to a more specific page. Second, the user could select an entity within a computer-aided drafting model of a plant. By selecting an entity within the model the web page displaying maintenance information relevant to that entity would be displayed. Third, the user could select a software tree node. By selecting the tree node the web page displaying maintenance information relevant to that node would be displayed. The user could also view a desired page by combining the above three methods.

The method for creating a web-based digital maintenance system comprises several steps. First, a hierarchy of entities within the plant must be defined. Then a database is created and structured in accordance with the hierarchy of entities, and information relevant to plant maintenance is entered into the database in the appropriate structural location. Finally, the information from the database is accessed in order to create web pages that display the information, and the web pages are linked to one another in the hierarchical order previously defined. The pages created are either gateway pages or document list pages.

The method for creating a web-based digital maintenance system can further comprise creating a computer-aided drafting model of the plant. Creating associations between entities within the model and web pages will allow a user to quickly find maintenance information relevant to a particular entity. A software tree can also be created within the model to enable a user to find maintenance information relevant to a particular entity by selecting a node within the tree. Finally, the web pages, software tree, and plant model can all be associated together in a way that enables a user to select an entity within the model, which expands the software tree to the node associated with the selected entity. The user can then select the node to display the web page that contains maintenance information regarding the selected entity.

BRIEF DESCRIPTION OF THE DRAWINGS

FIG. 8 is a chart displaying the different page types that the "Plant—Models List" page links to;

FIG. 11 is a chart displaying the different page types that a "Models" page links to;

FIG. 14 is a chart displaying the different page types that a "Unit" page links to;

FIG. 16 is a chart displaying the different page types that an "Equipment" page links to;

FIG. 18 is a chart displaying the different page types that a "Pipeline" page links to;

FIG. 20 is a chart displaying the different page types that an "Equipment Assembly Relationships" page links to;

FIG. 22 is a chart displaying the different page types that a "Pipeline Relationships" page links to;

FIG. 24 is a chart displaying the different page types that a "Components" page links to;

FIG. 26 is a chart displaying the page types that a "Maintainable Piping Parts" page links to;

FIG. 28 is a chart displaying the page types that a "Maintainable Piping Part" page links to;

FIG. 31 is a diagram showing generally which pages document list pages link to;

DETAILED DESCRIPTION OF THE PREFERRED EMBODIMENTS

Figure 1:
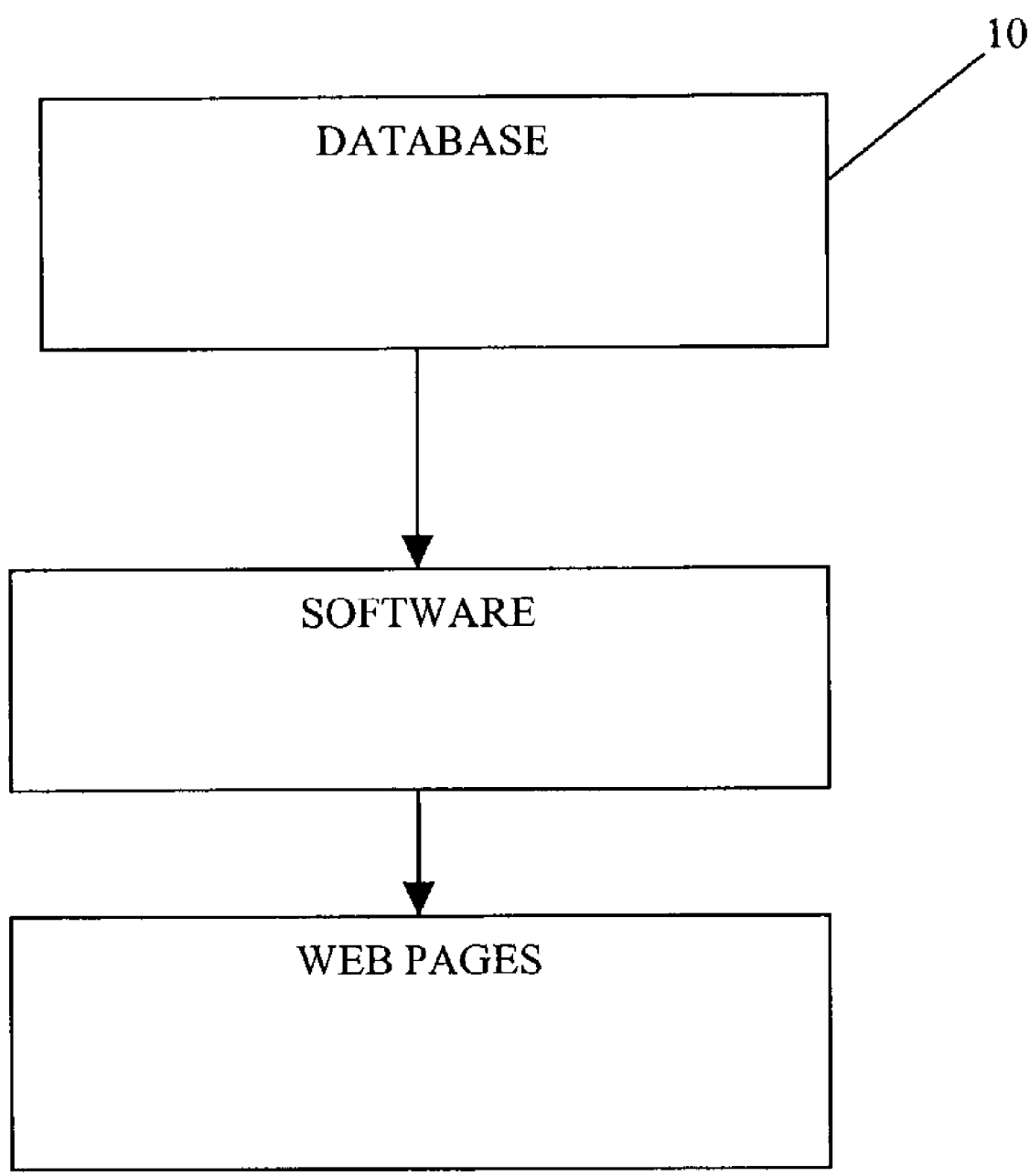
FIG. 1 is a diagram showing the interaction of the database and software.

The present invention provides tools in electronic format for linking engineering and maintenance documents to a computer-generated image of the plant components. The engineering and maintenance documents can include technical drawings, engineering criteria, supplier documentation, bill of materials and procedures, etc. The present invention can be utilized in every field in which plants are required to create a product or operate a process. The present invention could be used in the automotive industry, the coal processing industry, the aerospace industry, etc.

The present invention is a system that allows a user working in a plant to efficiently link engineering and maintenance documentation to equipment regardless of the plant design. The equipment and documentation can be easily found using common plant and discipline gateways. The gateways are logical connections from broad entities to more specific entities. For example, if a user wanted to find a technical drawing on part Y in machine X, he would use the following gateways: (1) "Plant—Models List" 20—this gateway would give the user a list of models of machines in the plant; (2) "Model" 24—this gateway would list all of the units in the plant that are of the requested model; (3) "Equipment" 36—this would list the equipment on the requested unit; (4) "Technical Drawings" 80—this would list all of the technical drawings relevant to part Y. The user then simply selects the desired technical drawing from the list. Other gateways are also available to enable the end user to find the exact documentation desired.

The present invention provides tools in electronic format for linking engineering and maintenance documents to a computer-generated image of a factory and its components.

The engineering and maintenance documents can include technical drawings, engineering criteria, supplier documentation, bill of materials and procedures describing a factory and its components. The present invention can be utilized in every field in which factories are required to create a product or operate a process. The present invention could be used in the automotive industry, the coal processing industry, the aerospace industry, or any other field.

The present invention is preferably integrated with a plant design drawn on a CAD system, but the invention can also be operated as a stand-alone program in a Microsoft Windows® environment. If the invention is operated as a stand-alone program, then the user would step through the gateways from the broadest gateway to the most specific. The gateways would be accessed through a web browser, and the succeeding gateways would be accessed by selecting the appropriate links.

If the software is integrated with a plant design utilizing a CAD system, then the user can access the appropriate gateway by using a mouse or like method to select the graphic entity in which documentation is desired. In this embodiment the invention is configured to integrate with software capable of displaying a "tree" of gateways upon the selection of an entity. The "tree" is structured in the same format as the gateways, i.e., in a logical order connecting broader entities to more specific entities. In this embodiment, the user can quickly and easily reach the maintenance page desired.

The software of the present invention allows a user to easily retrieve maintenance documentation regarding entities in a plant. The software utilizes a database which maintains generally the same structure for each client within a particular industry (e.g., coal processing), but whose contents vary with each client. The database consists of tables that allow the software to create several gateway pages as well as document list pages. The gateway pages may be comprised of several different types: "Plant—Models List" 20; "Model" 24; "Unit" 32; "Equipment" 36; "Pipeline" 44; "Equipment Assembly Relationships" 56; "Pipeline Relationships" 52; "Component" 60; "Maintainable Piping Parts" 48; and "Maintainable Piping Part" 64 pages. The document list pages are also comprised of several different types: "Plant—Reports List" 28; "Elevation Drawings" 100; "Installation Drawings" 104; "Technical Drawings" 80; "Maintenance Manuals" 84; "Purchase Orders" 88; "Supplier Documents" 92; and "Fabrication Drawings" 96 pages. The software also supplies links to different supplier web sites and links to a "Maintenance History" database 40. The names of the gateway and document list pages are names common in the field of plant maintenance, and are not meant to limit the software. Other names could be used to organize the data in the same manner.

FIG. 1 is a general diagram of the Digital Design and Maintenance System. The software accesses the data from the database 10 in order to create web pages for digital maintenance. The web pages are linked to each other in a logical order from broad entities to more specific entities established by the software for plant maintenance and documentation.

The database 10 is used to store a multitude of data. The data in the database 10 includes digital images, model names, model numbers, unit names, unit numbers, pipeline names (if used, e.g., for a coal processing plant), supplier web site locations, technical drawings, maintenance manuals, assembly instructions, field notes, purchase orders, elevation drawings, supplier documents, fabrication drawings, etc. In short, the database 10 contains identification information for anything the purchaser of the software may wish to maintain in a plant. The database 10 is structured in such a way that entering data into the correct database tables allows the software to quickly determine relationships between equipment, pipeline connections, the number of units of a particular model, the names of each unit, etc. The data to reside in the database 10 may be entered in one of two ways: (1) the providers of the software will travel to the plant to enter the data into the database tables; (2) the providers of the software will provide training to the client in order to allow the client to enter the data into the database tables. Either way, the data to be entered into the database 10 will be specific to the plant purchasing the software.

Figure 2:
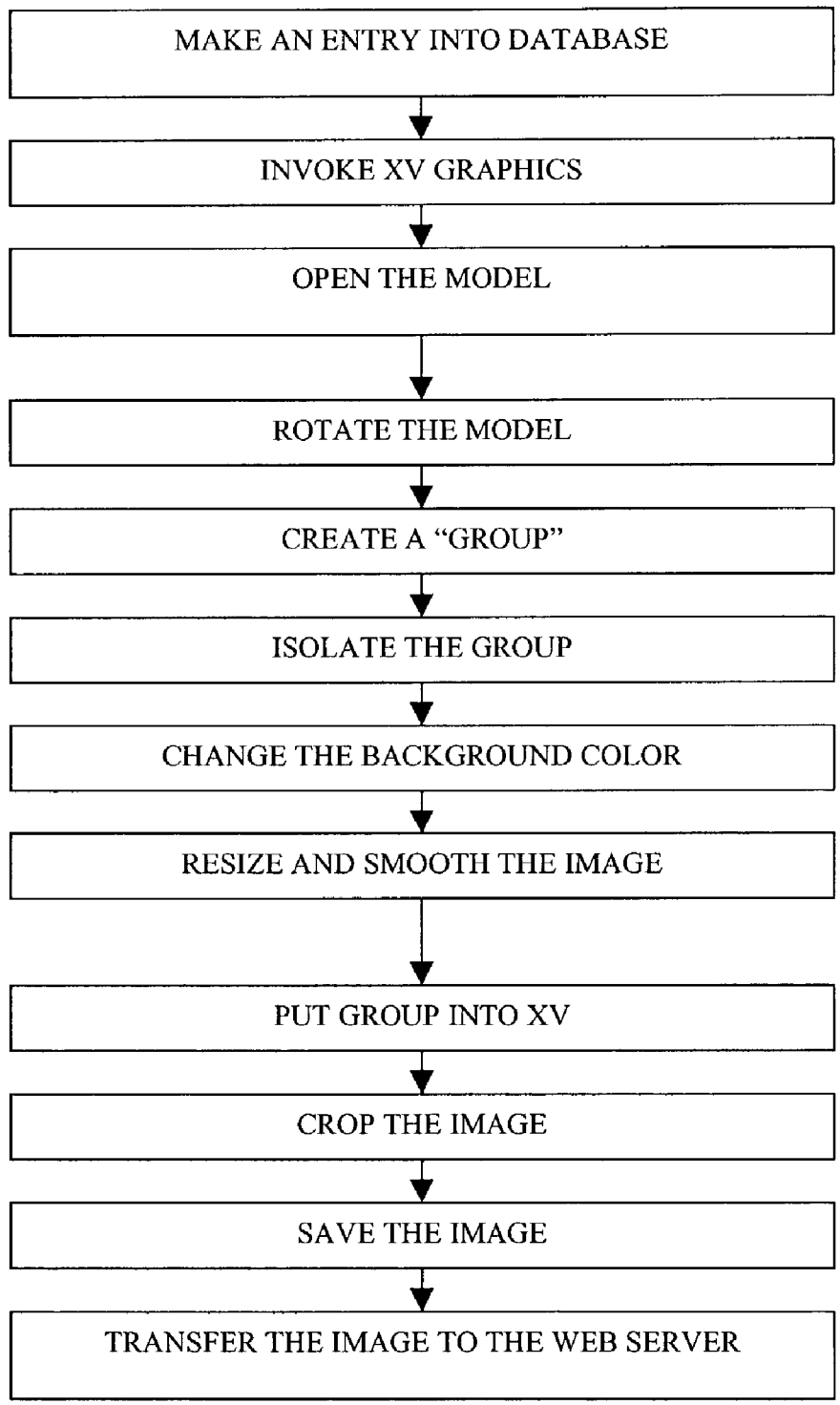
FIG. 2 is a flowchart showing a method for creating electronic images using computer-aided design software.

An important part of the data discussed above is the digital image that the web page is to display. The user will be more confident while navigating through the gateways if he is given images of the entities that the gateways are depicting. FIG. 2 depicts a method for extracting digital images from a computer aided design software, such as CATIA® and placing them in the database in order to allow the software to retrieve and display the image on an appropriate web page. The following procedure assumes the presence of the xv graphics utility on the machine running CATIA®. First, an entry in the database to store the picture must be created on the web server. After the entry has been made in the correct location, the following steps are taken:

(1) The xv graphics utility is invoked on the machine hosting CATIA®;

(2) The model containing the entity to be displayed on the web page is opened in CATIA®;

(3) The model is rotated to a desired view angle, and the "Reframe" button is selected in CATIA®;

(4) A group of entities to be displayed is selected. This allows the user to view only desired entities rather than the whole model. A group is created by selecting the "Group Editor" button, which brings up a dialog box. Within the dialog box the user will select "Group 1" followed by "Add." The user will then select the desired part(s) in the model that he wishes to display on a web page. After all of the desired part(s) have been selected, the user should close the dialog box;

(5) The parts are isolated. This can be done in CATIA® by first selecting the "No Show" button, followed by entering the text "*spc" into the command line. This will cause the entire model to disappear. Once the model is gone, the "Yes" button at the bottom of the page should be selected. This will cause the model to reappear. The "Select" menu in the CATIA® window should be pulled down. From this pull down menu the "Groups" menu should be selected. From this menu the "Geometry" menu should be enabled. Finally, underneath "Geometry Referenced by:" the user should select "Group1." This will highlight all of the part(s) previously selected. By selecting the "Yes" button twice, the unselected parts will disappear, leaving only the selected part(s) on the screen. The dialog box should be exited and the model reframed by selecting the "Reframe" button;

(6) Change the background color to the desired color (usually white). To change the background color to white, the mouse pointer should be near the center of the screen, and the F4 key should be selected. Selecting the F4 key will open a dialog box that allows the changing of colors. Near the top of the dialog box, the "COL" button should be selected. This will enable a vertical toolbar to the right. On the vertical toolbar, the "SPACE" button should be selected. Back in the dialog box, the "+" symbol beside all three color level boxes (Red, Green, and Blue) should be selected until they are all set at 15. Once the color levels are set to 15, the "OFF" button in the dialog box should be selected. The background color will now be changed to white;

(7) The image should be an appropriate size for convenient cropping. The user may need to resize the image and drag it to a position that is convenient for cropping;

(8) The F3 key should be pressed, and the image should be smoothed by selecting the "Paintbrush" icon;

(9) A screen grab of the CATIA® model needs to be grabbed and placed in xv. This is done by first minimizing CATIA®. Once CATIA® is minimized, the "GRAB" button in xv should be selected. A dialog box will appear, and in the dialog box there will be a "Delay" text box. A time sufficient to finish the rest of the steps (around 6 seconds) should be entered into the "Delay" text box. CATIA® should then be restored, and the model should be dragged very slightly in any direction. After the time duration has passed, xv will acquire a screen grab;

(10) CATIA® should be minimized and the image should be cropped. The image can be cropped by restoring xv's image window. A mouse can be used to create a box around the image. This is done by clicking near one corner of the image and dragging the mouse pointer to the opposite corner of the image. The box can then be modified by selecting the box's nodes and moving them in a desired direction. After the box is at a desired size, the image in xv should be minimized, and the user should return to xv's main interface. On the main interface the "CROP" button should be selected. The image will be cropped;

(11) The image should be saved in .jpg format to a directory on the computer hosting CATIA®. The picture must be saved in a file location where the web server can gain access to the picture using an FTP session;

(12) The image should be transferred to the web server. This is done by establishing an FTP session between the machine hosting CATIA® and the web server. The file can then be transferred to the entry location created earlier on the web server in a manner well known in the art of transferring files using FTP; and

(13) It may be necessary to change the name of the image. The reason for having to change the name is that sometimes the CATIA®-side name differs from the web server's naming convention. For example, sometimes CATIA® uses underscores when naming parts, and the web server's convention is to use spaces. Therefore, on the web server the underscores in the image's name would have to be removed and replaced with spaces.

While FIG. 2 depicts storing digital images in the database that were made in CATIA®, the client can store any digital image that he desires. For example, the client could use a digital camera, photograph the entities he wants to display on the web page, and then store those pictures in the database.

Once the correct data is entered into the database structures, the software program may be initiated to create a web-based maintenance documentation system.

Figure 3:
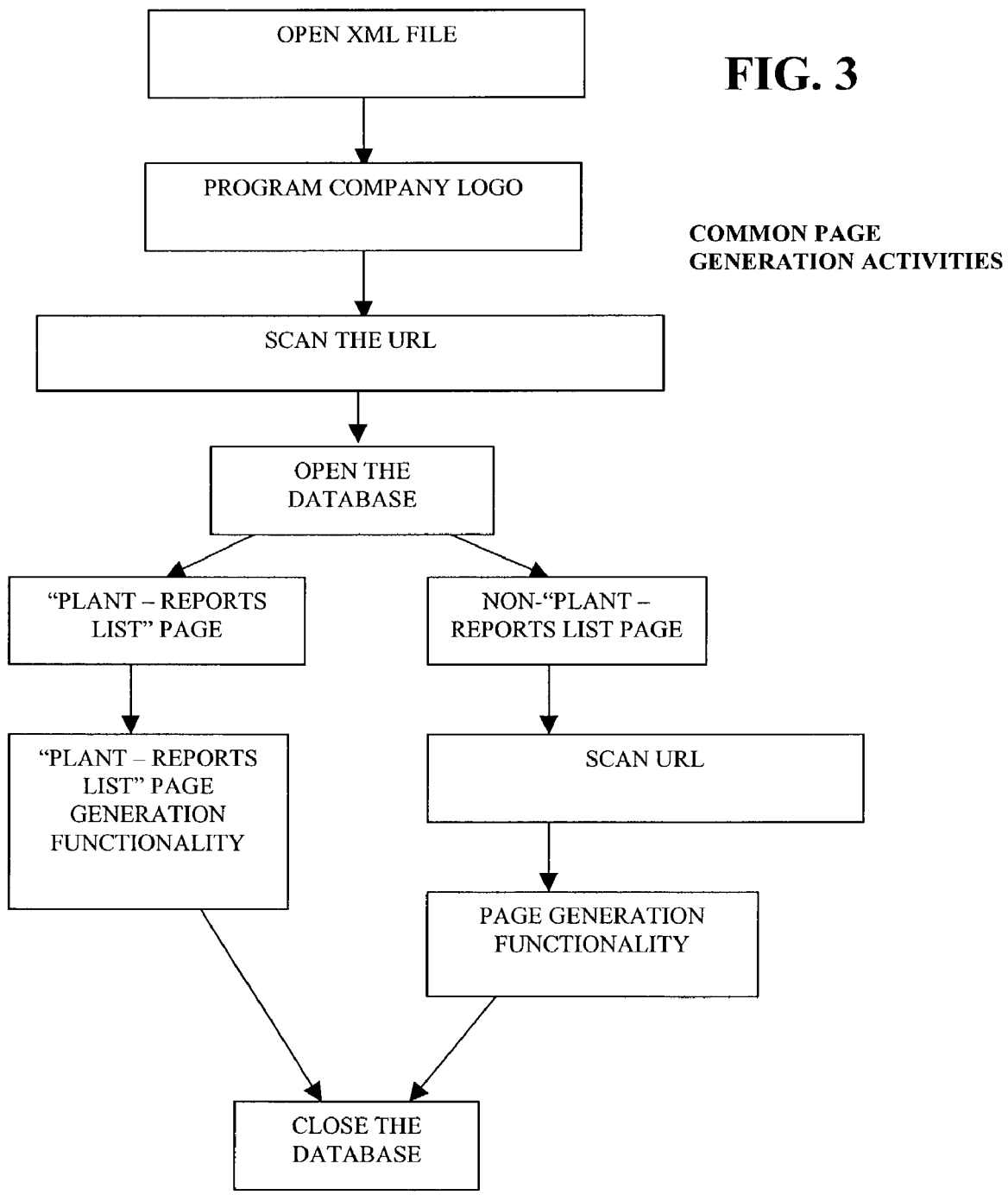
FIG. 3 is a flowchart showing common page generation functionality.

FIG. 3 depicts steps that the software takes in the creation of each web page. The software first extracts project information, such as directory paths, to the database structures and project names, from an eXtensible Markup Language (XML) file. Because different clients may wish to store the database structures in different locations, and because project names will differ with each client, the XML file will vary with each client.

The software then initiates the construction of a page capable of being viewed by a web browser. The software uses HTML to script a logo or header that is specific to each company. The client can receive training in order to enter the HTML necessary to create the logo, or the provider of the software can enter it for them. The software then scans the text of the URL of the web page being constructed to obtain a variety of vital information.

The URL of the web page will contain information regarding the page type, entity identification, circuit identification (models that have been grouped together for plant identification purposes) and sequencing information. This is possible because the web pages are created in a logical order. For example, when the first web page is generated, the URL will contain information that the page being constructed should be a "Plant—Models List" page 20. The URL will also contain sequencing information and entity identification information in order to inform the software what the next page should be. More specifically, a "Plant—Models List" 20 page's URL could be http://plant4.htm. Then a "Model" page 24 depicting a model with a model ID of "machineX" and a circuit ID of 3 could be created underneath the "Plant—Model List" page 20 with a URL http://plant4/machineX_3.htm. A "Unit" page 32 depicting a unit with a unit ID of "3005" created underneath the "Model" page 24 would have a URL of http://plant4/machineX_3/3005.htm. From this short example, it can be seen that the software could scan the URL of the "Unit" page 32 and determine the plant ID, the model ID, the circuit ID, and the unit ID. The software could then use this information to determine what the page beneath it should be. Every time a new web page is created the URL is updated first so it can quickly be scanned for information.

Once the page type is determined, the software opens the database. If a "Plant—Models List" page 20 is to be created, the software invokes a page generating functionality specifically designed to create "Plant—Models List" page 20. These specific page generating functions are described in detail below. If the page to be created is not a "Plant—Models List" page 20, the software will scan the text of the URL to determine the entity that the web page will display. The software will then look up data relevant to the entity. Finally, a page generation functionality that is specific to the page type will be invoked. For example, if the page to be created is a "Unit" page 32, the software will invoke a page generation functionality specific to creating "Unit" pages 32.

Figure 4:
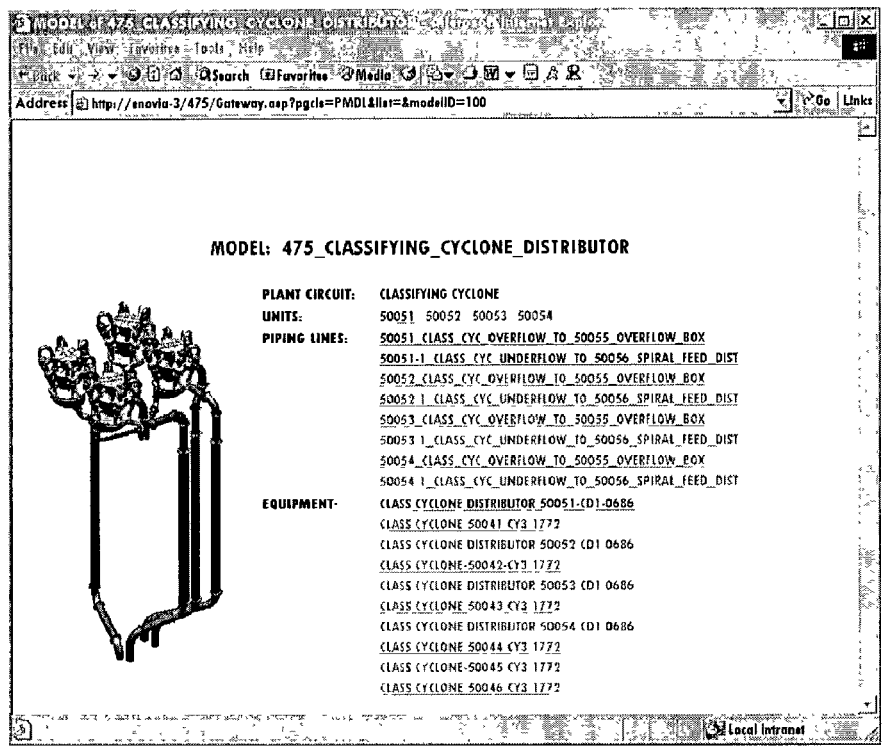
FIG. 4 is one possible layout of a gateway page viewed by an end user.
Figure 5:
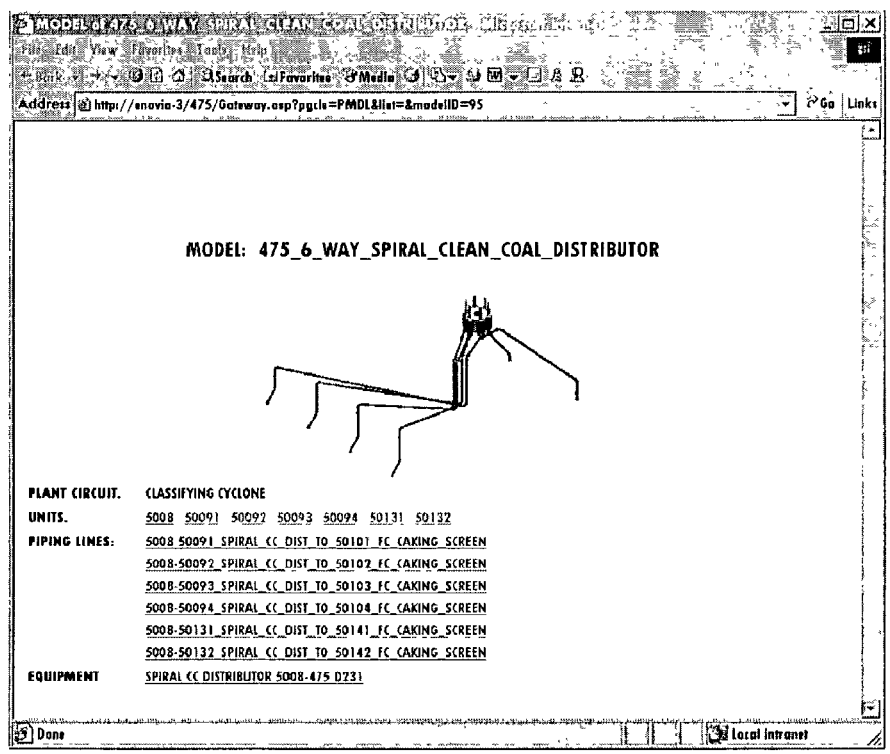
FIG. 5 is another possible layout of a gateway page viewed by an end user.

The software also creates a function that will be executed upon an end user loading a web page. The function (1) calculates the number of lines to be viewed on the page; (2) calculates the width of the longest line of text; and (3) calculates height-to-width ratio of the digital image to appear on the web page. The function then takes these values and displays the web page allowing for optimized text spacing, readability, and image size. The final page will appear in the format depicted by either FIG. 4 or FIG. 5.

Gateway Descriptions and Creation

Figure 6:
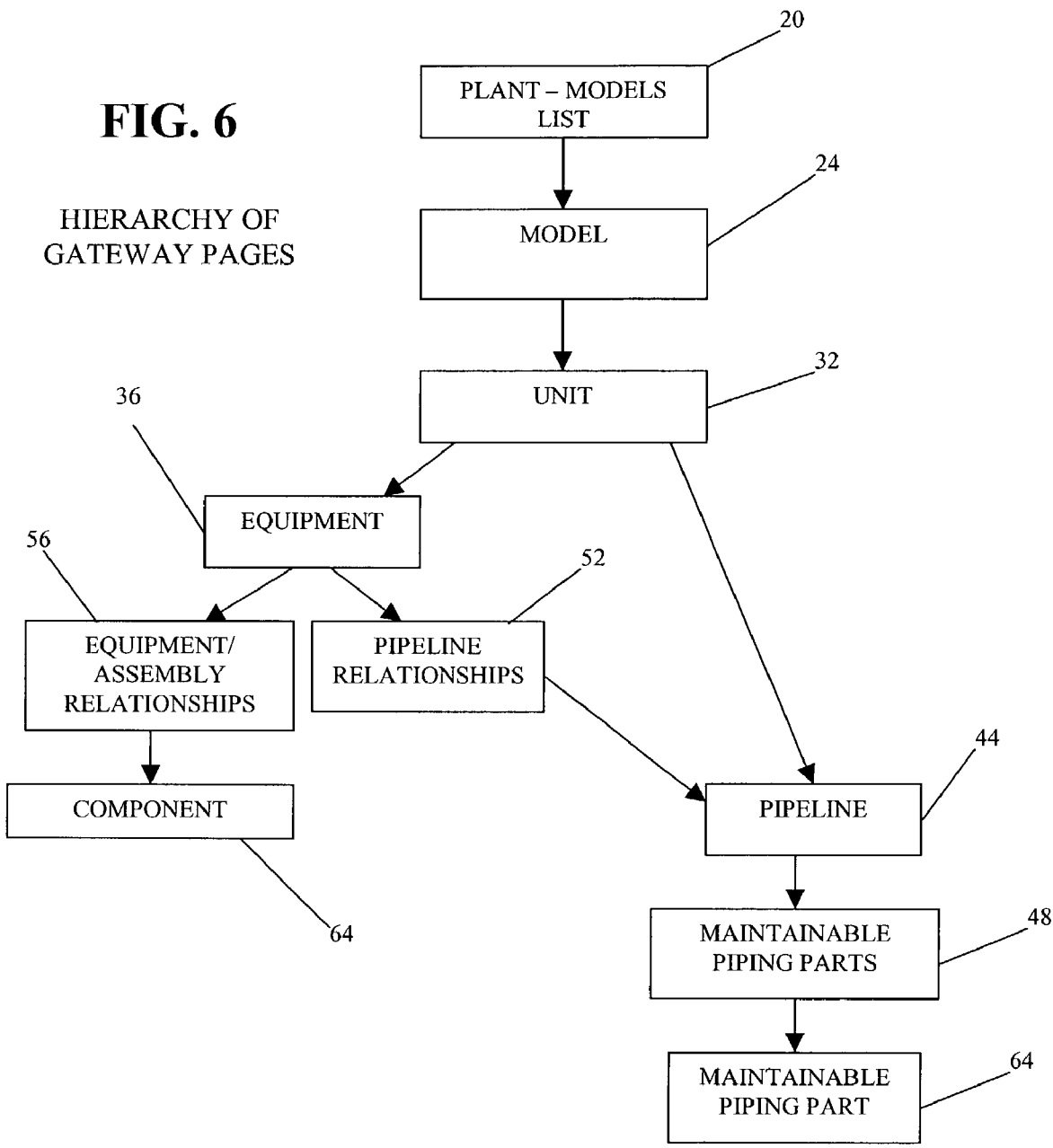
FIG. 6 is a chart displaying a hierarchy of gateway pages.

FIG. 6 is a flowchart depicting the general hierarchy of the gateways. FIG. 6 should be referred to for each gateway page discussed to see where the page fits in the overall hierarchy. The invention will first be described as if it is operating stand-alone in a Windows® environment rather than with a computer-aided drafting environment. After the invention's operation is described as stand-alone software, the invention will be described operating together with a computer-aided drafting system.

Plant—Models List Gateway Page

Figure 7:
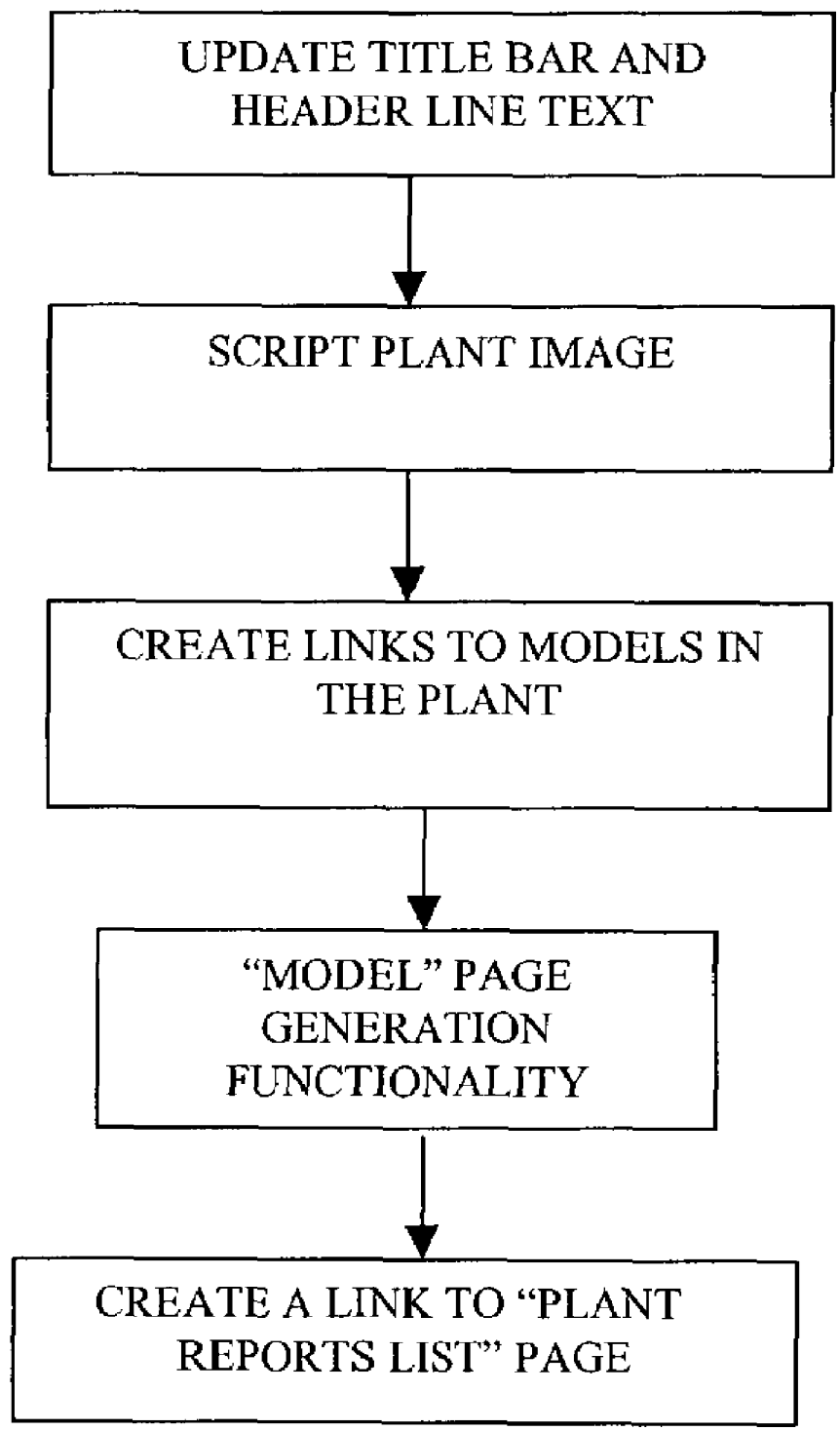
FIG. 7 is a flow diagram displaying the steps taken by the software to create a "Plant—Models List" page.

In the preferred embodiment the "Plant—Models List" 20 is the broadest gateway page. It contains a digital image of the overall plant and a list of all the models of machines that are utilized in the plant. Each listed model will also be a web link. By selecting a link, the user will be directed to a web page containing specific information about the desired model. If there are any reports regarding the plant in general, a "Plant Reports—Reports List" link will be provided to access those reports. FIG. 7 is a flowchart displaying the steps taken by the software to specifically create a "Plant—Models List" page 20, and FIG. 8 displays the page types that the "Plant—Models List" page 20 links to. In the remaining figures all page types that are document list pages will be shaded in the flowcharts. FIG. 9 is a diagram of a completed "Plant—Models List" page 20.

Figure 8:
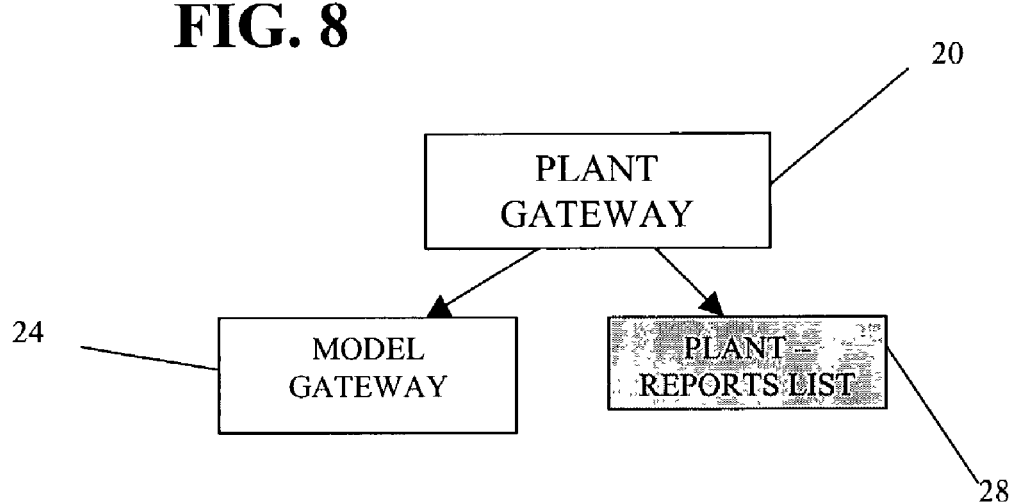
Figure 9:
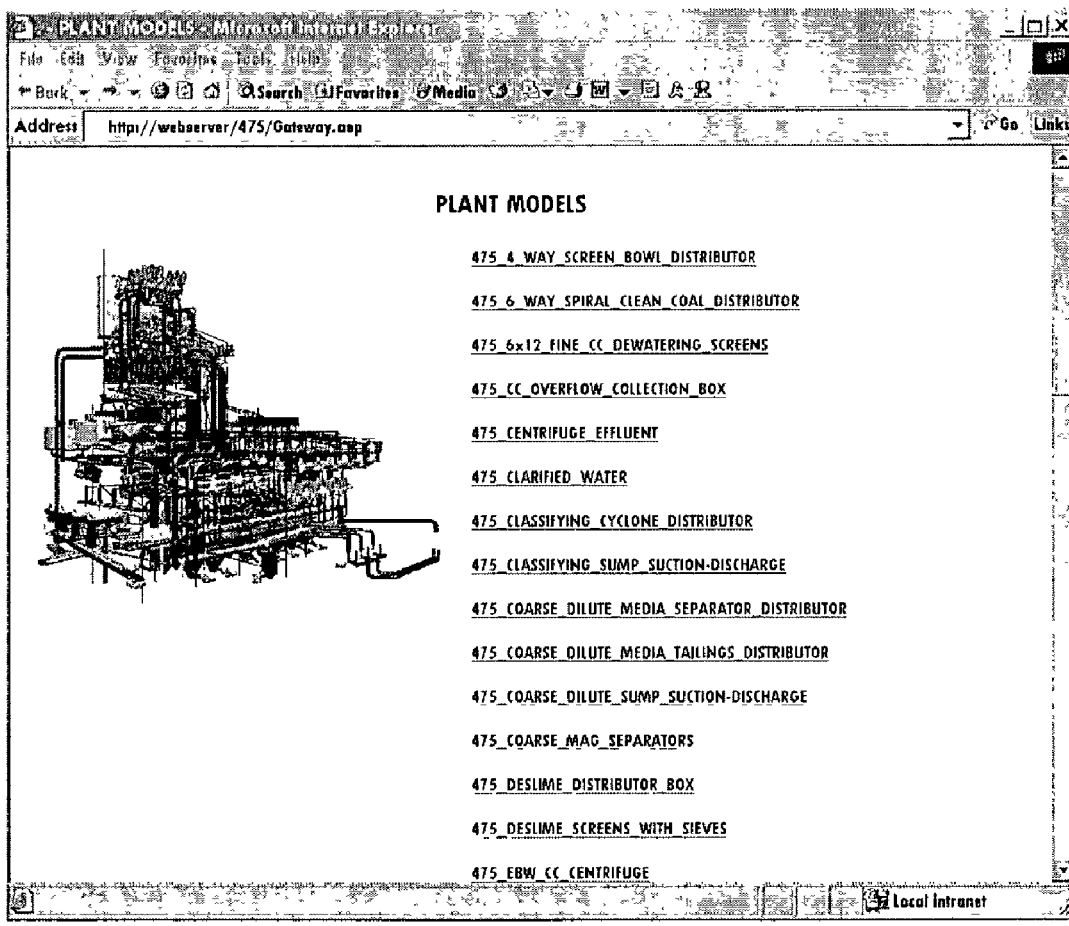
FIG. 9 is a view of a completed "Plant—Models List" page.

Referring to FIGS. 7 and 8, the following steps are taken by the software to create a "Plant—Models List" page 20 after the "Plant-Models List" page generation functionality has been activated:

(1) The page's title bar and header line text are updated;

(2) The display of the appropriate plant-level image is scripted;

(3) The "Models" links are scripted. The database is queried to create a list of all of the plant models within the plant. A link is created for each listed model, which will link to the gateway page of the selected model. For each model listed the software will invoke the "Model" page generation functionality;

(4) A link is scripted to the "Plant—Reports List" document list page 28; and (5) The "Plant—Reports List" page generation functionality is invoked.

Model Gateway Page

Figure 10:
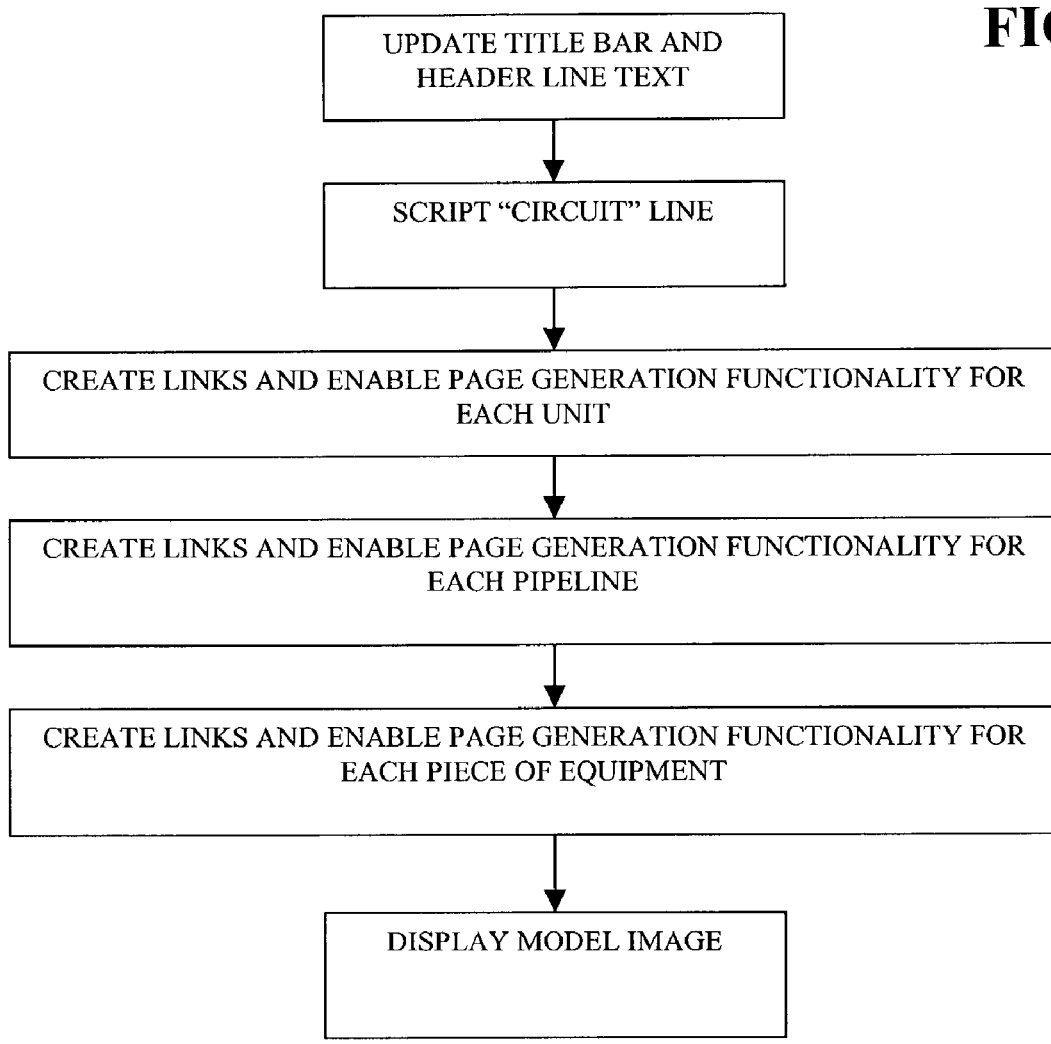
FIG. 10 is a flow diagram displaying the steps taken by the software to create a "Models" page.

The "Model" page type 24 is the next broadest gateway page. The "Model" page 24 contains a digital image of the model from which the user wishes to retrieve information. The page also includes a list of all of the units, equipment, and pipelines associated with the selected model. Each listed unit, equipment, and pipeline will also be a web link that can be selected to narrow the user's search for maintenance documentation. FIG. 10 is a flowchart displaying the steps taken by the software to specifically create a "Model" page 24, and FIG. 11 displays the page types that the "Model" page 24 links to. FIG. 12 is a diagram of what a page type of "Model" looks like upon completion. Each page type beneath a "Model" page 24 (all pages except "Model" page 24 and "Plant—Models List" page 20) contain a link back to the parent "Model" page 24.

Figure 11:
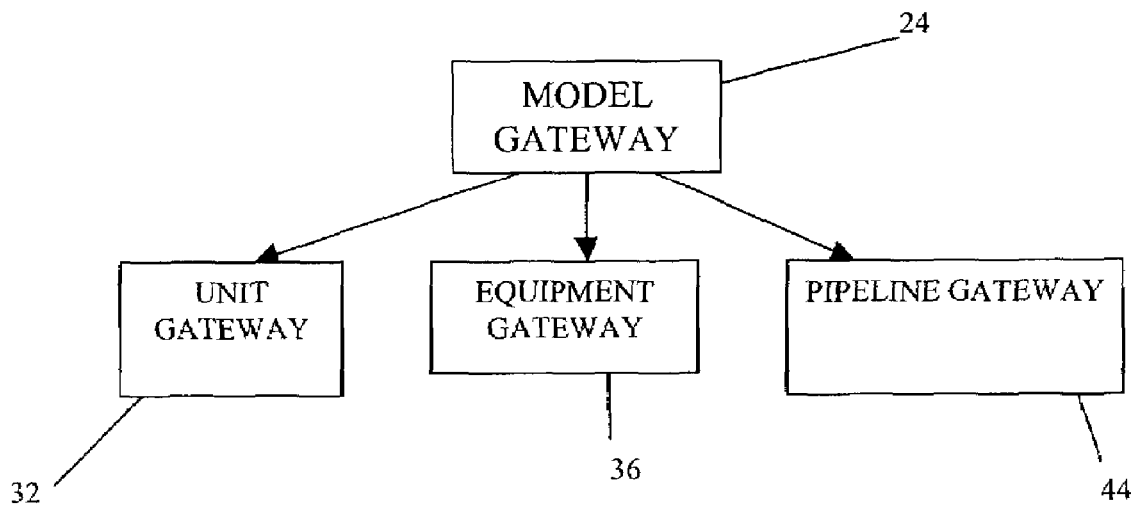
Figure 12:
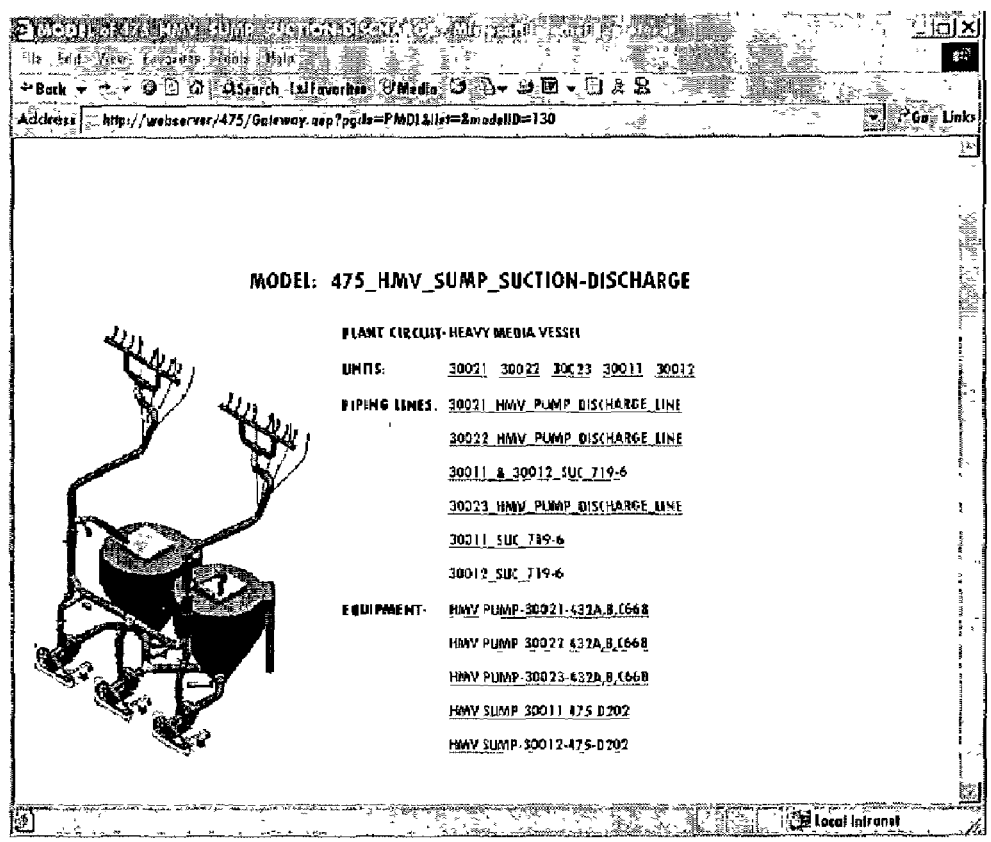
FIG. 12 is a view of a completed "Models" page.

Referring to FIGS. 10 and 11, the following steps are taken by the software to create a "Model" gateway page 24 after the "Model" page generation functionality has been activated:

(1) The page's title bar and header line text are updated;

(2) The "Circuit" line is scripted. This ID of the circuit is taken from the URL;

(3) The "Units" links are scripted. The database is queried to create a list of all of the units associated with the model. A link is created for each unit, which will link to the gateway page of the selected unit. For each unit listed, the "Unit" page generation functionality is invoked;

(4) The "Processing Piping Lines" links are scripted. The database is queried to create a list of all of the pipelines associated with the model. A link is created for each pipeline, which will link to the gateway page of the selected pipeline. For each pipeline listed, the "Pipeline" page generation functionality is invoked;

(5) The "Equipment" links are scripted. The database is queried to create a list of all of the equipment associated with the model. A link is created for each piece of equipment, which will link to the gateway page of the selected equipment. For each piece of equipment listed, the "Equipment" page generation functionality is invoked; and (6) The name and path of the image to appear on the web page is set.

The Unit Gateway Page

Figure 13:
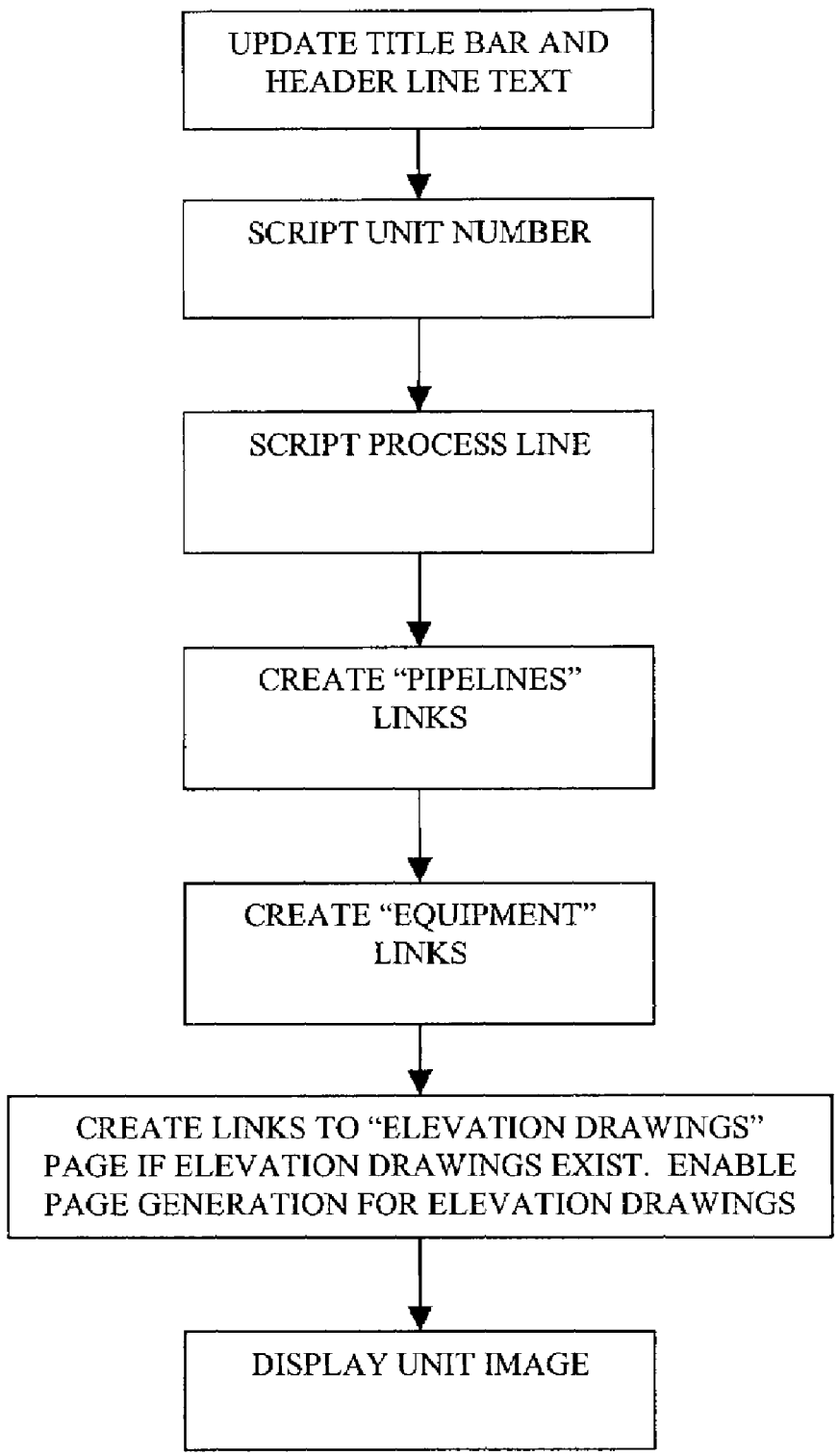
FIG. 13 is a flow diagram displaying the steps taken by the software to create a "Unit" page.

The "Unit" page 32 is the next logical page when searching for maintenance materials on a piece of equipment. The "Unit" page 32 can be accessed by selecting a unit from the "Model" page 24. The unit page enables a user to narrow a search or documentation on a specific unit. The "Unit" page 32 contains a list of each piece of equipment and pipeline associated with the selected unit. Each piece of equipment and pipeline listed will also be a web link. The "Unit" page 32 also contains a link to an elevation drawing document list page. By selecting the "Elevation Drawings" link the user will have access to all elevation drawings regarding that specific unit. A page of type "Unit" 32 also contains a link back to the "Model" page 24. FIG. 13 is a flowchart displaying the steps taken by the software to specifically create a "Unit" page 32, and FIG. 14 displays the page types that the "Unit" page 32 links to.

Figure 14:
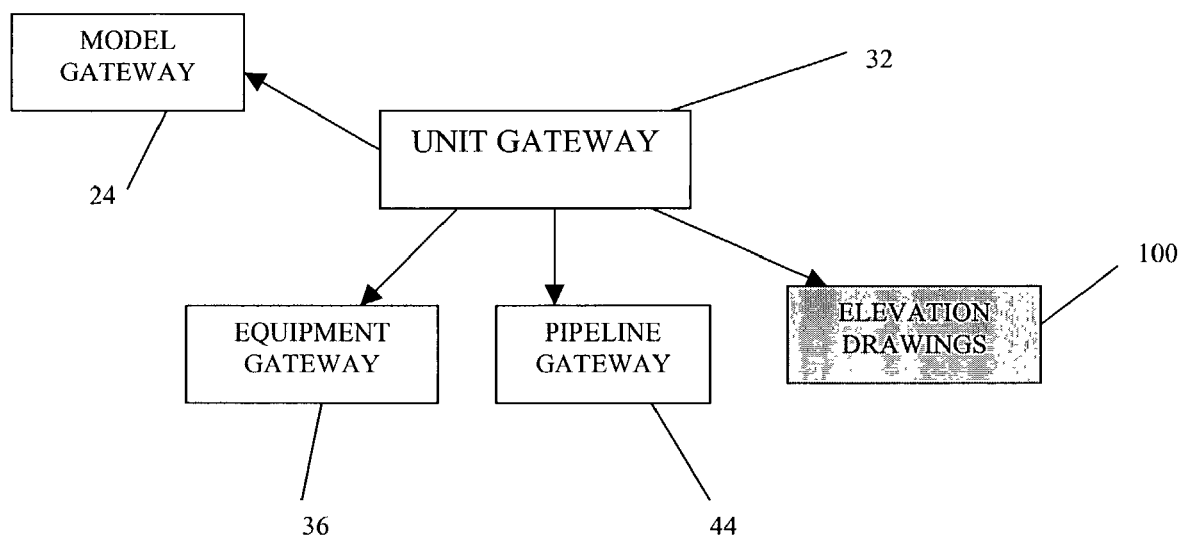

Referring to FIGS. 13 and 14, the following steps are taken by the software to create a "Unit" gateway page 32 after the "Unit" page generation functionality has been activated:

(1) The page's title bar and header line text are updated;

(2) The "Unit" line is scripted. This line displays the identification of the played on the web page. The software extracts this information from the URL;

(3) The "Process" line is scripted. The database is queried to create a list of all of the processes associated with the unit;

(4) The "Piping Lines" links are scripted. The database is queried to create a list of all of the piping lines associated with the unit. A link is created for each pipeline, which will link to the gateway page of the selected pipeline;

(5) The "Equipment" links are scripted. The database is queried to create a list of all of the equipment associated with the unit. A link is created for each piece of equipment, which will link to the gateway page of the selected equipment;

(6) The "Elevation Drawings" link is scripted. The database is queried to determine if any elevation drawings exist. If elevation drawings exist, a link to an "Elevation Drawings" document list page is enabled. A document list page listing elevation drawings is created. If elevation drawings do not exist, the link becomes an inactive or "null" link; and (7) The name and path of the image to appear on the web page is set.

Equipment Gateway Page

Figure 15:
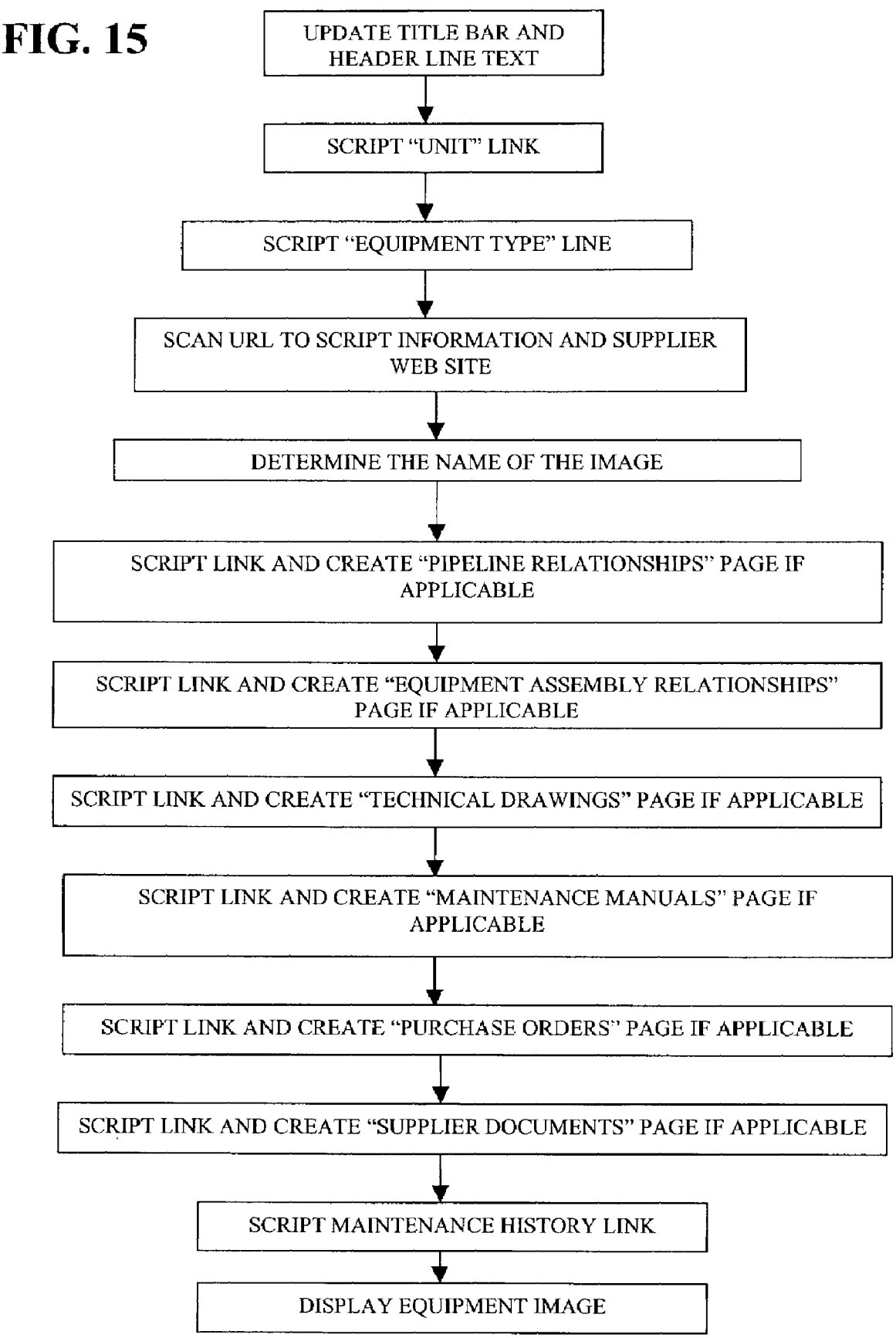
FIG. 15 is a flow diagram displaying the steps taken by the software to create an "Equipment" page.
Figure 16:
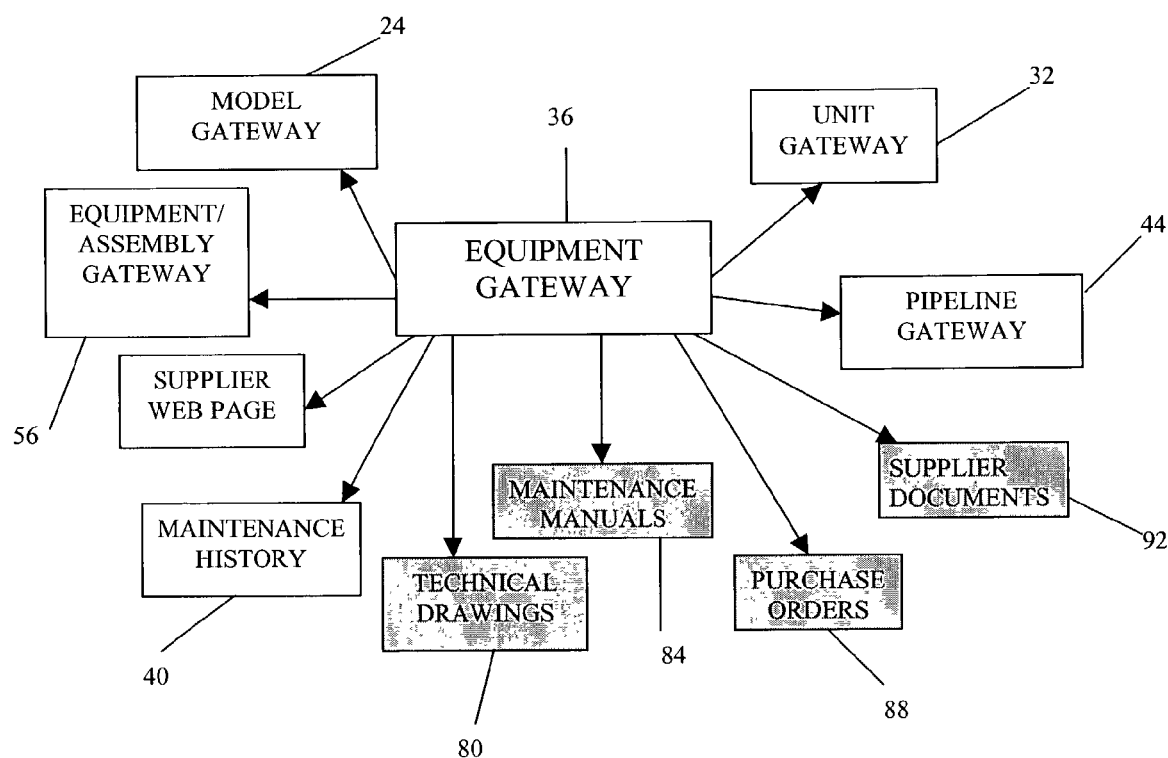

The "Equipment" page 36 can be accessed through a "Model" page 24 or a "Unit" page 32. The user can easily access the desired equipment through a "Model" page 24 because the units and equipment have been named and numbered in a like manner. For example, if a unit has been numbered "3001", then a piece of equipment associated with that unit would be named "PUMP_3001". There may be, however, other equipment associated with other units on the "Model" page 24. On a "Unit" page 32 the only equipment listed will be equipment specific to the unit previously selected. An "Equipment" page 36 is more specific than a "Unit" 32, "Model" 24, or "Plant—Models List" page 20. The "Equipment" page 36 will contain links to several document list pages, including links to pages listing technical drawings, maintenance manuals, purchase orders, and supplier documents. FIG. 16 displays all of the pages that an "Equipment" page will link to. Referring to FIG. 16, "Maintenance History" 40 refers to a database chronicling the maintenance history on the piece of equipment, including the man-hours spent on the equipment, previous costs of maintenance, or any other information regarding prior maintenance. End users have the ability to modify this database in order to keep all maintenance matters up to date. FIG. 15 is a flowchart displaying the steps taken by the software to specifically create an "Equipment" page 36.

Referring to FIGS. 15 and 16, the following steps are taken by the software to create an "Equipment" gateway page 36 after the "Equipment" page generation functionality has been activated:

(1) The page's title bar and header line text are updated;

(2) The "Unit" link is scripted. This links back to the unit of which the equipment belongs. The software extracts the unit ID from the URL;

(3) The equipment "Type" line is scripted. This line displays the identification of the equipment displayed on the web page. The software extracts the equipment ID from the URL;

(4) The "Supplier ID" line is scripted. This line displays the name of the supplier of the equipment. The software extracts the supplier ID from the URL;

(5) The "Supplier" link is scripted. This links to the external web site of the supplier of the equipment. The software extracts the link to a supplier web site from the URL;

(6) The name of the image to appear on the web page is determined;

(7) The "Pipeline Relationships" link is scripted. The database is queried to determine if any pipeline relationships exist. If pipeline relationships do exist, a link to a "Pipeline Relationships" gateway page 52 is enabled. Then the "Pipeline Relationships" page generation functionality is invoked. If no pipeline relationships exist, the link becomes an inactive or "null" link;

(8) The "Equipment Assembly Relationships" link is scripted. The database is queried to determine if any equipment assembly relationships exist. If equipment assembly relationships do exist, a link to an "Equipment Assembly Relationships" gateway page 56 is enabled. Then the "Equipment Assembly Relationships" page generation functionality is invoked. If no equipment assembly relationships exist, the link becomes an inactive or "null" link;

(9) The "Technical Drawings" link is scripted. The database is queried to determine if any technical drawings exist. If technical drawings do exist, a link to a "Technical Drawings" document list page 80 is enabled. Then a document list page listing technical drawings is created. If no technical drawings exist, the link becomes an inactive or "null" link;

(10) The "Maintenance Manuals" link is scripted. The database is queried to determine if any maintenance manuals exist. If maintenance manuals do exist, a link to a "Maintenance Manuals" document list page 84 is enabled. Then a document list page listing maintenance manuals is created. If no maintenance manuals exist, the link becomes an inactive or "null" link;

(11) The "Purchase Orders" link is scripted. The database is queried to determine if any purchase orders exist. If purchase orders do exist, a link to a "Purchase Orders" document list page 88 is enabled. Then a document list page listing purchase orders is created. If no purchase orders exist, the link becomes an inactive or "null" link;

(12) The "Supplier Documents" link is scripted. The database is queried to determine if any supplier documents exist. If supplier documents do exist, a link to a "Supplier Documents" document list page 92 is enabled. Then a document list page listing supplier documents is created. If no supplier documents exist, the link becomes an inactive or "null" link;

(13) The maintenance history link is scripted. This allows access to a database where maintenance history is documented. The end user can add or modify maintenance history information in this database; and

(14) The name and path of the image to appear on the web page is set.

Pipeline Gateway Page

Figure 17:
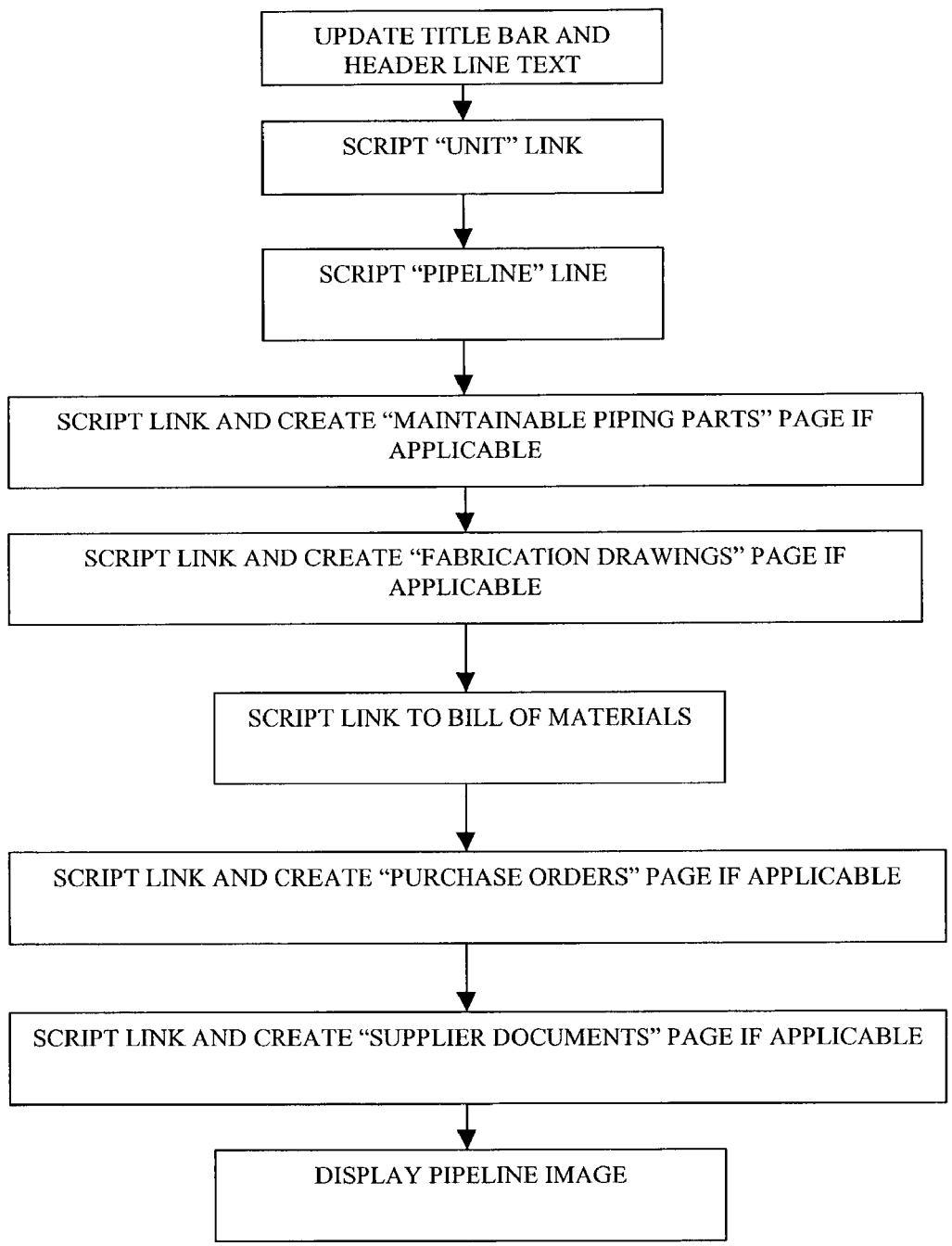
FIG. 17 is a flow diagram displaying the steps taken by the software to create a "Pipeline" page.

A "Pipeline" page 44 can also be accessed through a "Model" 24 or "Unit" page 32. The naming conventions described for the units and equipment above are the same for units and pipelines. As shown in FIG. 6, a "Pipeline" page 44 is also more specific than a "Unit" 32, "Model" 24, or "Plant—Models List" page 20. The "Pipeline" page 44 is parallel to the "Equipment" page 36 in that it also contains links to several document list pages. The document list pages that are accessible through a "Pipeline" page 44 include web pages that list fabrication drawings, purchase orders, and supplier documents for the specified pipeline. A "Pipeline" page 44 also contains a direct link to a bill of materials, which in the preferred embodiment exists in a .pdf form. FIG. 17 is a flowchart displaying the steps taken by the software to create a "Pipeline" page, and FIG. 18 is a diagram showing the pages that a "Pipeline" page will link to.

Figure 18:
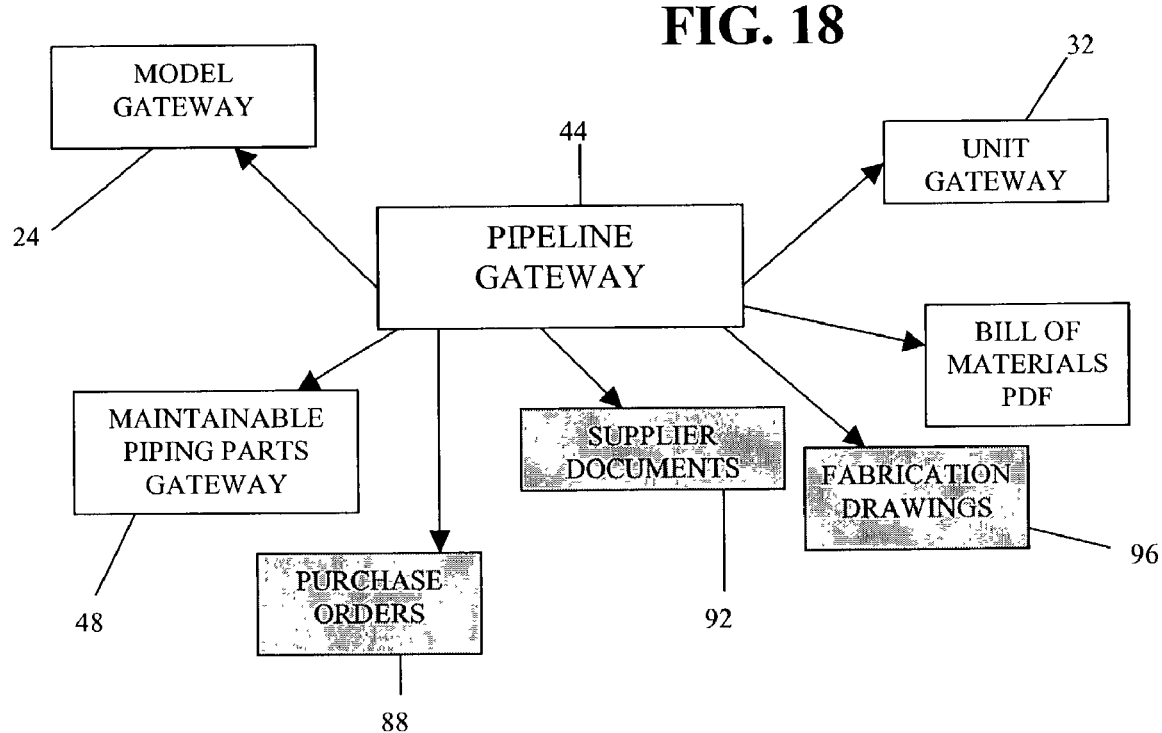

Referring to FIGS. 17 and 18, the following steps are taken by the software to create a "Pipeline" gateway page 44 after the "Pipeline" page generation functionality has been activated:

(1) The page's title bar and header line text are updated;

(2) The "Unit" link is scripted. This links back to the unit of which the pipeline belongs. The software extracts the unit ID from the URL;

(3) The "Piping Line ID" line is scripted. This line displays the name of the piping line. The software extracts the Pipeline ID from the URL;

(4) The "Maintainable Piping Parts" link is scripted. The database is queried to determine if any maintainable piping parts exist. If maintainable piping parts do exist, a link to a "Maintainable Piping Parts" gateway page 48 is enabled. Then the "Maintainable Piping Parts" page generation functionality is invoked. If no maintainable piping parts exist, the link becomes an inactive or "null" link;

(5) The "Equipment Assembly Relationships" link is scripted. The database is queried to determine if any equipment assembly relationships exist. If equipment assembly relationships do exist, a link to an "Equipment Assembly Relationships" gateway page 56 is enabled. If no equipment assembly relationships exist, the link becomes an inactive or "null" link;

(6) The "Fabrication Drawings" link is scripted. The database is queried to determine if any fabrication drawings exist. If fabrication drawings do exist, a link to a "Fabrication Drawings" document list page 96 is enabled. Then a document list page listing fabrication drawings is created. If no fabrication drawings exist, the link becomes an inactive or "null" link;

(7) The "Bill of Materials" link is scripted. The database is queried to determine if a bill of materials exists for the pipeline. If a bill of materials does exist, a direct link is established to a .pdf file. If no bill of materials exists, the link becomes an inactive or "null" link;

(8) The "Purchase Orders" link is scripted. The database is queried to determine if any purchase orders exist. If purchase orders do exist, a link to a "Purchase Orders" document list page 88 is enabled. Then a document list page listing purchase orders is created. If no purchase orders exist, the link becomes an inactive or "null" link;

(9) The "Supplier Documents" link is scripted. The database is queried to determine if any supplier documents exist. If supplier documents do exist, a link to a "Supplier Documents" document list page 92 is enabled. Then a document list page listing supplier documents is created. If no supplier documents exist, the link becomes an inactive or "null" link; and

(10) The name and path of the image to appear on the web page is set.

Equipment Assembly Relationships Gateway Page

Figure 19:
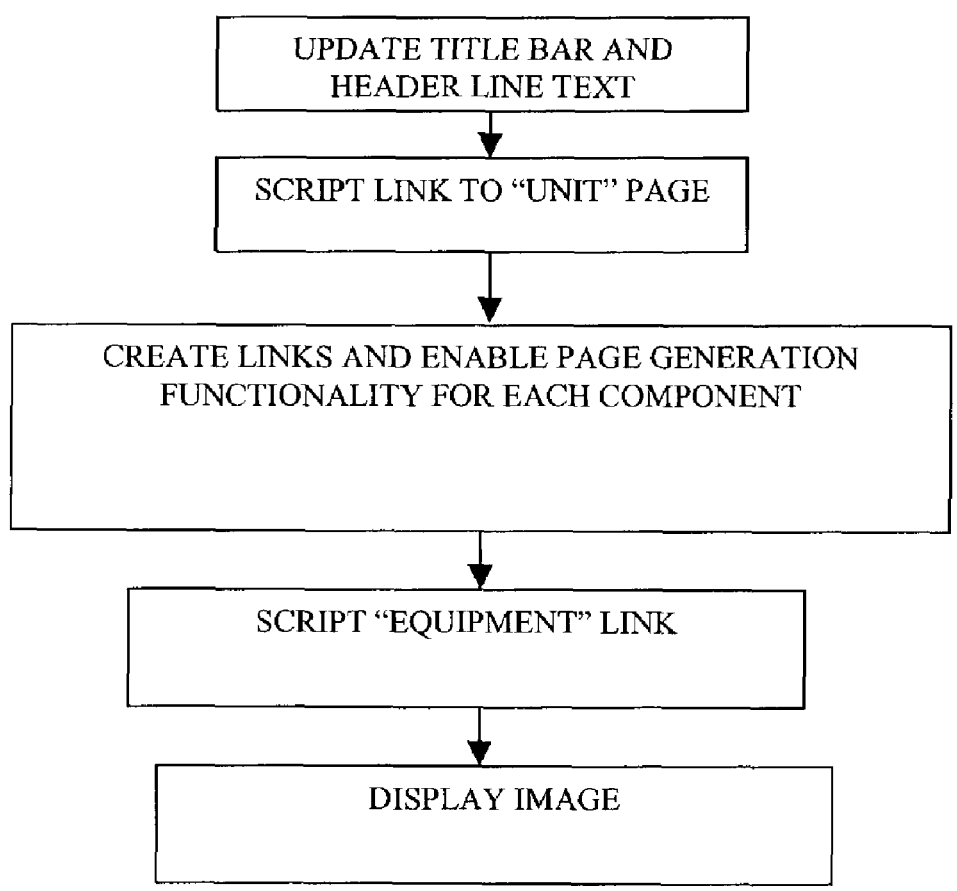
FIG. 19 is a flow diagram displaying the steps taken by the software to create an "Equipment Assembly Relationships" page.

An "Equipment Assembly Relationships" page 56 can only be accessed through an "Equipment" page 36. An "Equipment Assembly Relationships" page 56 contains a direct link to assembly instructions. An "Equipment Assembly Relationships" page 56 also lists all of the components related to the selected equipment, and furthermore each listed entry will be a link to a "Components" page 60. FIG. 19 is a flowchart displaying the steps taken by the software to create an "Equipment Assembly Relationships" page 56, and FIG. 20 is a diagram showing the pages that an "Equipment Assembly Relationships" page 56 will link to.

Figure 20:
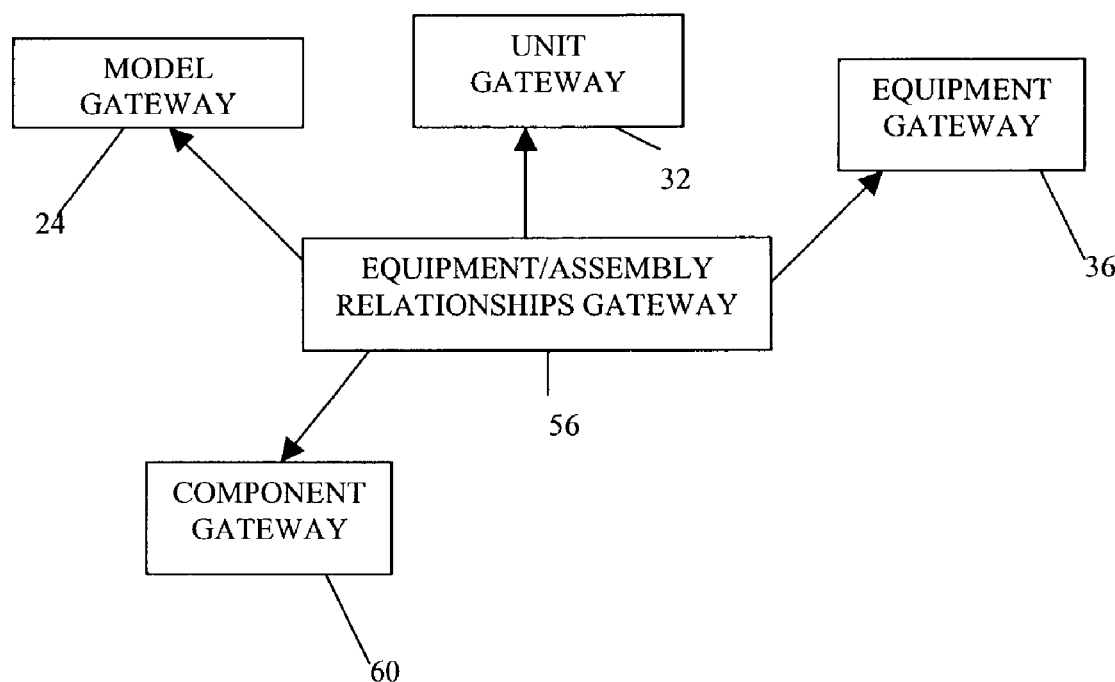

Referring to FIGS. 19 and 20, the following steps are taken by the software to create an "Equipment Assembly Relationships" gateway page 56 after the "Equipment Assembly Page" page generation functionality has been activated:

(1) The page's title bar and header line text are updated;

(2) The "Unit" link is scripted. This links back to the unit to which the equipment assembly relationship belongs. The software extracts the unit ID from the URL;

(3) The "Component" links are scripted. The database is queried to create a list of all of the components associated with the equipment. A link is created for each component, which will link to the gateway page of the selected component. For each component listed the "Component" page generation functionality will be invoked;

(4) The "Equipment Assembly" link is scripted. This links back to the equipment to which the equipment assembly relationship belongs. The software extracts the ID of the equipment from the URL; and (5) The name and path of the image to appear on the web page is set.

Pipeline Relationships Gateway Page

Figure 21:
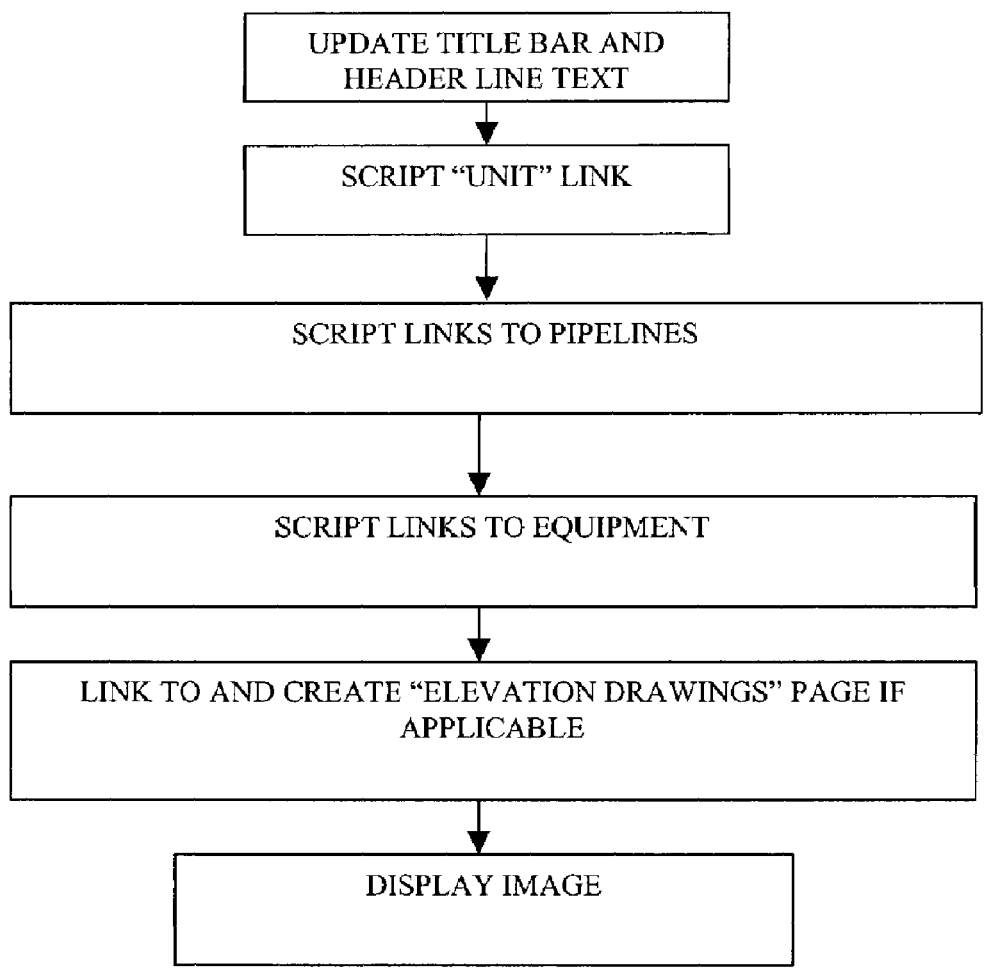
FIG. 21 is a flow diagram displaying the steps taken by the software to create a "Pipeline Relationships" page.

Like an "Equipment Assembly Relationships" page 56, a "Pipeline Relationships" page 52 can only be accessed through an "Equipment" page 36. The purpose of a "Pipeline Relationships" page 52 is to display all of the pipelines associated with a selected piece of equipment. The page will contain links to every pipeline that is associated with the selected piece of equipment. A "Pipeline Relationships" page 52 will also contain a link to a document list page containing all of the elevation drawings for the unit. FIG. 21 is a flowchart displaying the steps taken by the software to create a "Pipeline Relationships" page 52, and FIG. 22 is a diagram showing the pages that a "Pipeline Relationships" page 52 will link to.

Figure 22:
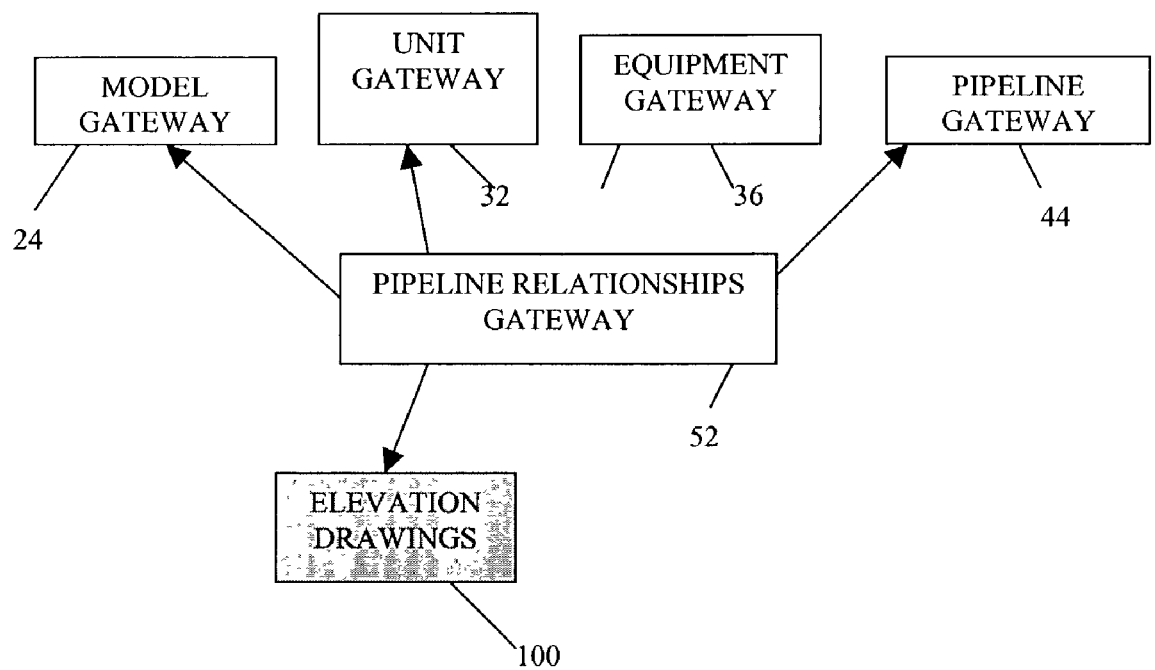

Referring to FIGS. 21 and 22, the following steps are taken by the software to create a "Pipeline Relationships" gateway page 52 after the "Pipeline Relationships Page" page generation functionality has been activated:

(1) The page's title bar and header line text are updated;

(2) The "Unit" link is scripted. This links back to the unit to which the pipeline relationship belongs. The software extracts the unit ID from the URL;

(3) The "Piping Lines" links are scripted. The database is queried to create a list of all of the pipelines associated with the equipment. A link is created for each pipeline, which will link to the gateway page of the selected pipeline;

(4) The "Equipment" links are scripted. The database is queried to create a list of all of the equipment associated with the unit;

(5) The "Elevation Drawings" link is scripted. The database is queried to determine if any elevation drawings exist. If elevation drawings exist, a link to an "Elevation Drawings" document list page 100 is enabled. Then a document list page listing elevation drawings is created. If elevation drawings do not exist, the link becomes an inactive or "null" link; and (6) The name and path of the image to appear on the web page is set.

Component Gateway Page

Figure 23:
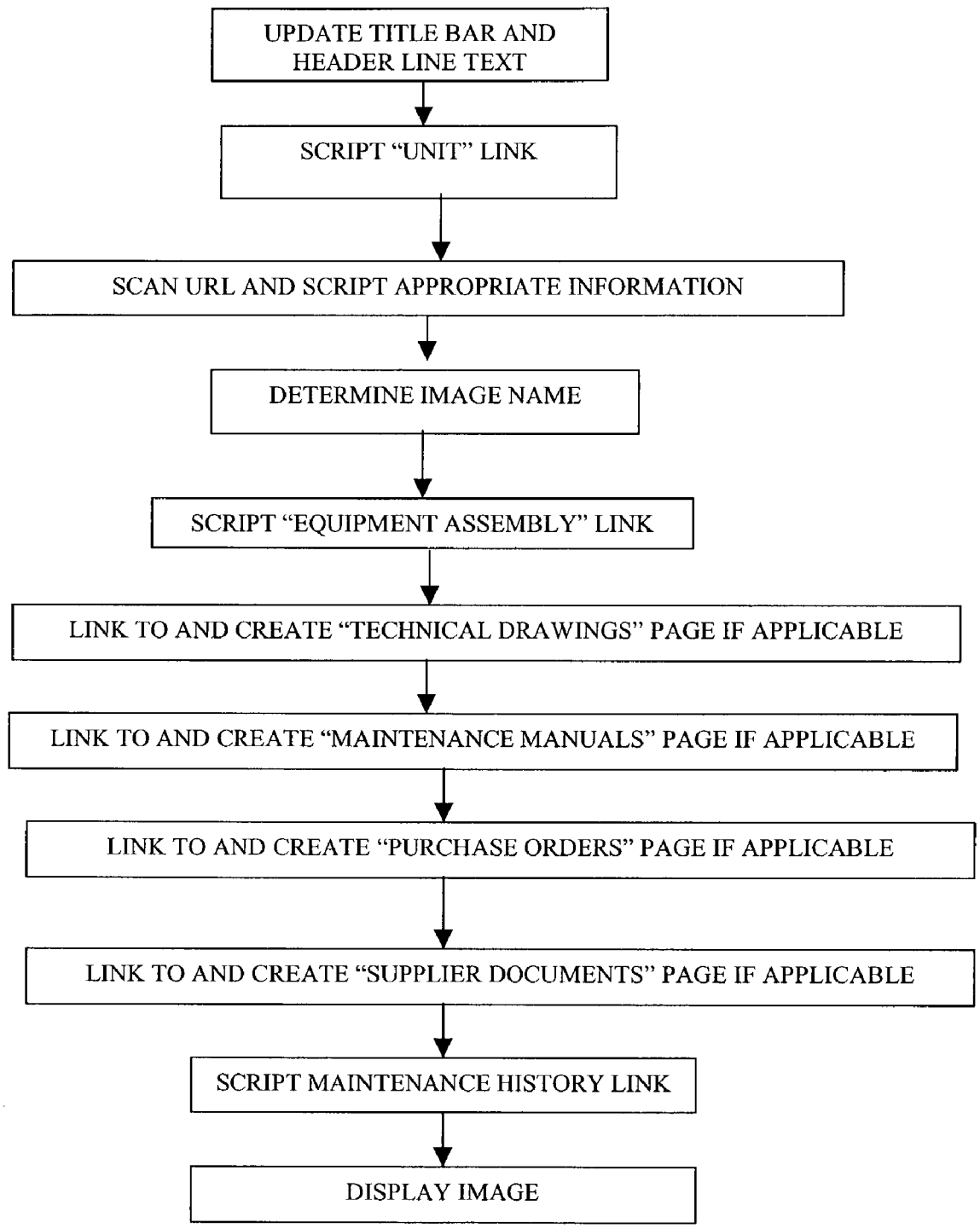
FIG. 23 is a flow diagram displaying the steps taken by the software to create a "Components" page.

A "Component" page 60 can only be accessed through an "Equipment Assembly Relationships" page 56. The setup of a "Component" web page 60 and an "Equipment" web page 36 are very similar. A "Component" page 60 is used to retrieve data regarding specific components of a piece of equipment. The page links to several document list pages, including pages that list technical drawings, maintenance manuals, purchase orders, and supplier documents. A "Component" page 60 will also have a link to the maintenance history database 40, and to an external supplier's web site if it exists. FIG. 23 is a flowchart displaying the steps taken by the software to create a "Component" page 60, and FIG. 24 is a diagram showing the pages that a "Component" page 60 will link to.

Figure 24:
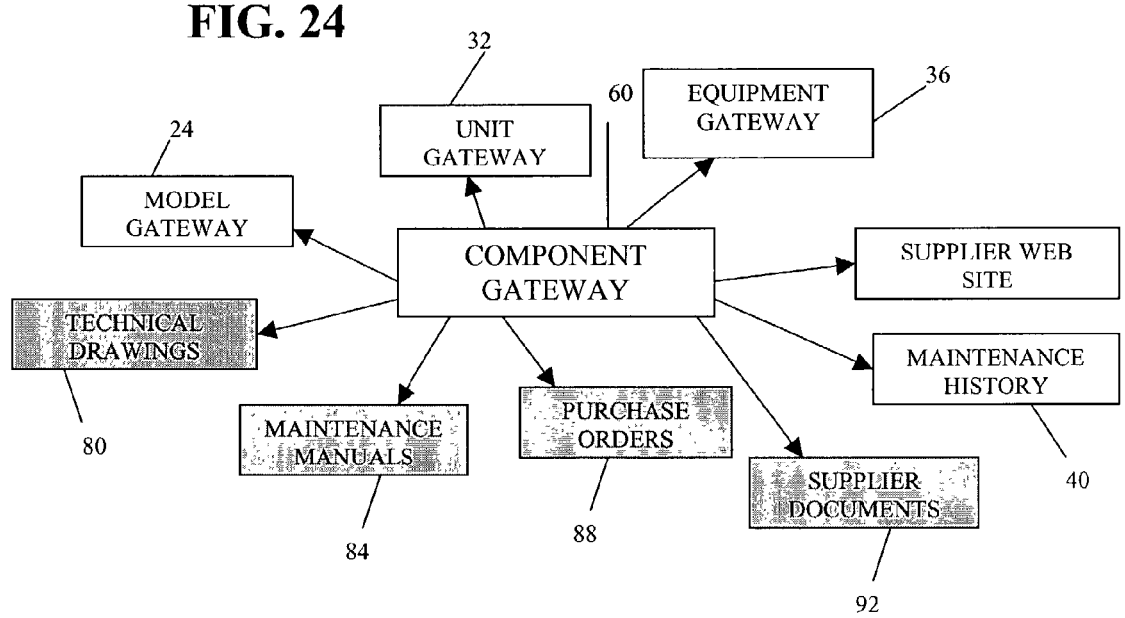

Referring to FIGS. 23 and 24, the following steps are taken by the software to create a "Component" gateway page 60 after the "Component" page generation functionality has been activated:

(1) The page's title bar and header line text are updated;

(2) The "Unit" link is scripted. This links back to the unit to which the equipment belongs. The software extracts the unit ID from the URL;

(3) The equipment "Type" line is scripted. This line displays the identification of the equipment displayed on the web page. The software extracts the equipment ID from the URL;

(4) The "Supplier ID" line is scripted. This line displays the name of the supplier of the equipment. The software extracts the supplier ID from the URL;

(5) The "Supplier" link is scripted. This links to the external web site of the supplier of the equipment. The software extracts the web site information from the URL;

(6) The name of the image to appear on the web page is determined;

(7) The "Equipment Assembly" link is scripted. This links back to the equipment to which the component belongs. The software extracts the equipment ID from the URL;

(8) The "Technical Drawings" link is scripted. The database is queried to determine if any technical drawings exist. If technical drawings do exist, a link to a "Technical Drawings" document list page 80 is enabled. Then a document list page listing technical drawings is created. If no technical drawings exist, the link becomes an inactive or "null" link;

(9) The "Maintenance Manuals" link is scripted. The database is queried to determine if any maintenance manuals exist. If maintenance manuals do exist, a link to a "Maintenance Manuals" document list page 84 is enabled. Then a document list page listing maintenance manuals is created. If no maintenance manuals exist, the link becomes an inactive or "null" link;

(10) The "Purchase Orders" link is scripted. The database is queried to determine if any purchase orders exist. If purchase orders do exist, a link to a "Purchase Orders" document list page 88 is enabled. Then a document list page listing purchase orders is created. If no purchase orders exist, the link becomes an inactive or "null" link;

(11) The "Supplier Documents" link is scripted. The database is queried to determine if any supplier documents exist. If supplier documents do exist, a link to a "Supplier Documents" document list page 92 is enabled. Then a document list page listing supplier documents is created. If no supplier documents exist, the link becomes an inactive or "null" link;

The "Maintenance History" link is scripted. This allows access to a database where maintenance history is documented. The end user can add or modify maintenance history information in this database; and

(13) The name and path of the image to appear on the web page is set.

Maintainable Piping Parts Gateway Page

Figure 25:
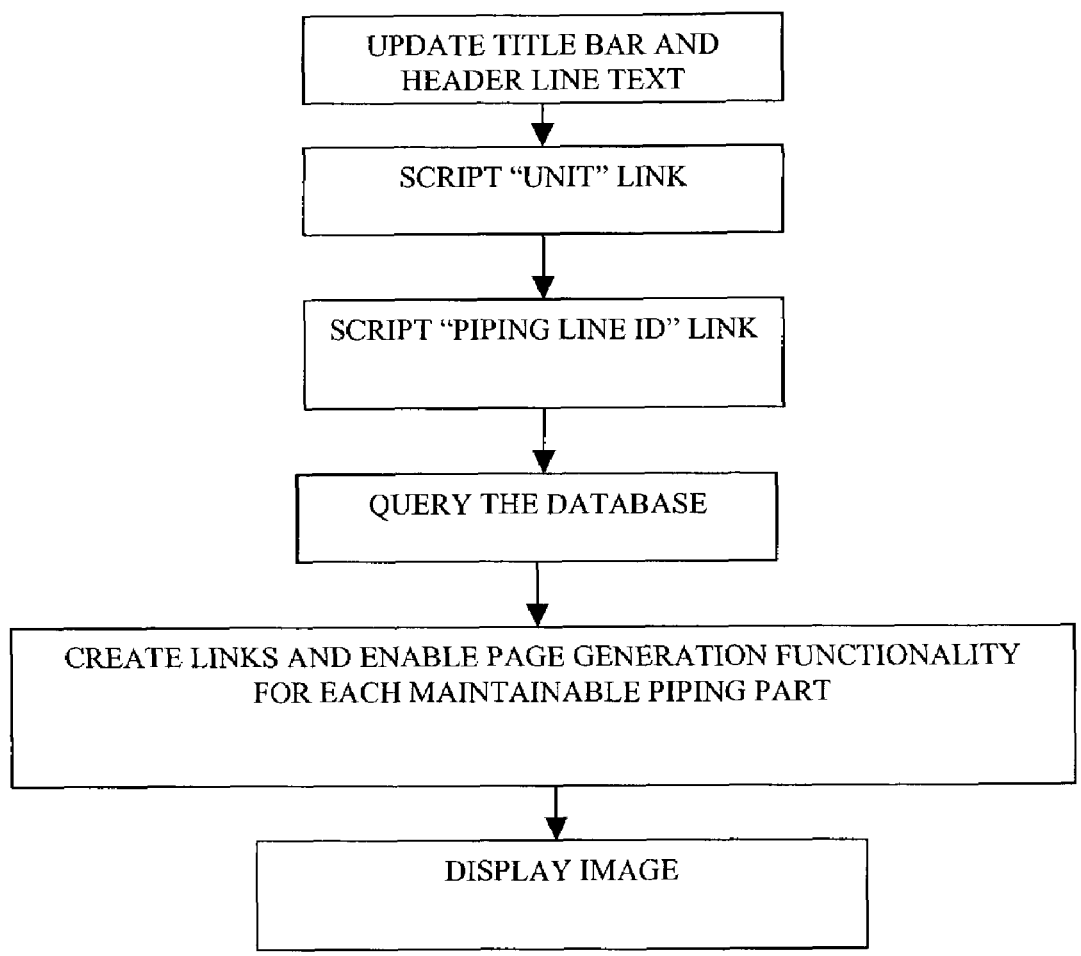
FIG. 25 is a flow diagram displaying the steps taken by the software to create a "Maintainable Piping Parts" page.

A "Maintainable Piping Parts" page 48 can only be accessed through a "Pipeline" page 44. The purpose of a "Maintainable Piping Parts" page 48 is to list and provide links to all of the piping parts of a specific pipeline that can be maintained. These parts could include seals, joints, or any other part of a pipeline that may need maintenance. FIG. 25 is a flowchart displaying the steps taken by the software to create a "Maintainable Piping Parts" page 48, and FIG. 26 is a diagram showing the pages that a "Maintainable Piping Parts" page 48 will link to.

Figure 26:
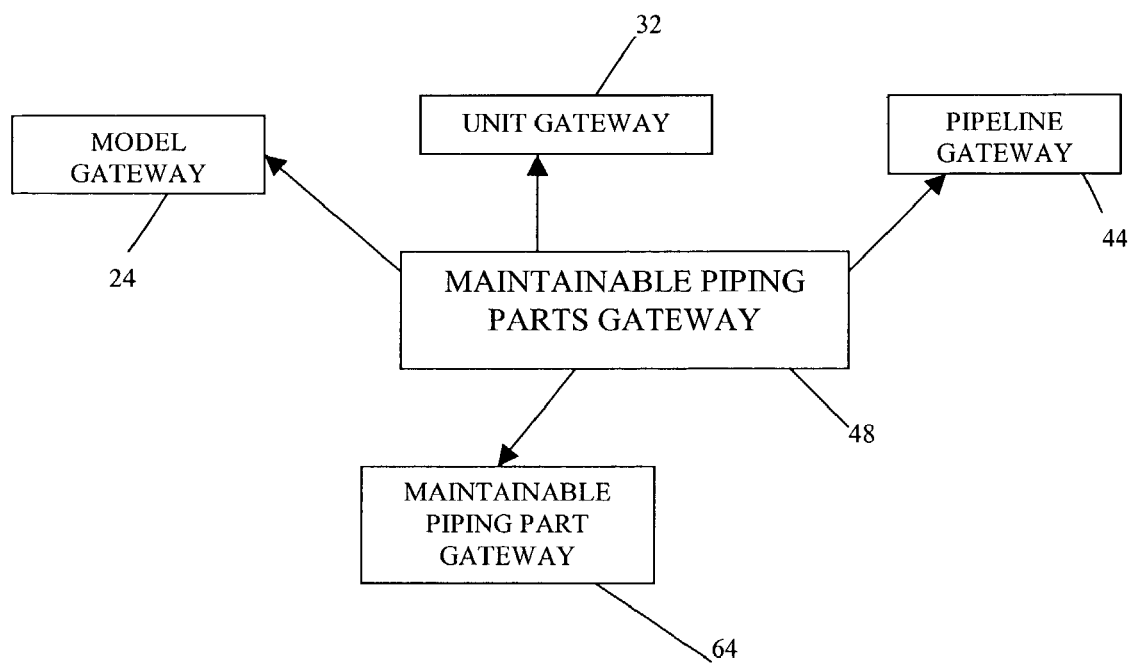

Referring to FIGS. 25 and 26, the following steps are taken by the software to create a "Maintainable Piping Parts" gateway page 48 after the "Maintainable Piping Parts" page generation functionality has been activated:

(1) The page's title bar and header line text are updated;

(2) The "Unit" link is scripted. This links back to the unit to which the piping parts belong. The software extracts the unit ID from the URL;

(3) The "Piping Line ID" link is scripted. This links back to the pipeline to which the piping parts belong. The software extracts the pipeline ID from the URL;

(4) The "Maintainable Parts" link is scripted. The database is queried to create a list of all of the maintainable piping parts associated with the pipeline. A link is created for each maintainable part, which will link to the gateway page of the selected maintainable part. For each maintainable piping part listed, the "Maintainable Piping Part" page generation functionality is invoked; and (5) The name and path of the image to appear on the web page is set.

Maintainable Piping Part Gateway Page

A "Maintainable Piping Part" page 64 is accessed through a "Maintainable Piping Parts" page 48 by selecting an individual piping part. Once the user reaches a "Maintainable Piping Part" page 64 he has access to several document list pages, including pages listing maintenance manuals, supplier documents, technical drawings, and installation drawings. The maintenance history database is also accessible through a "Maintainable Piping Part" page 64.

Figure 27:
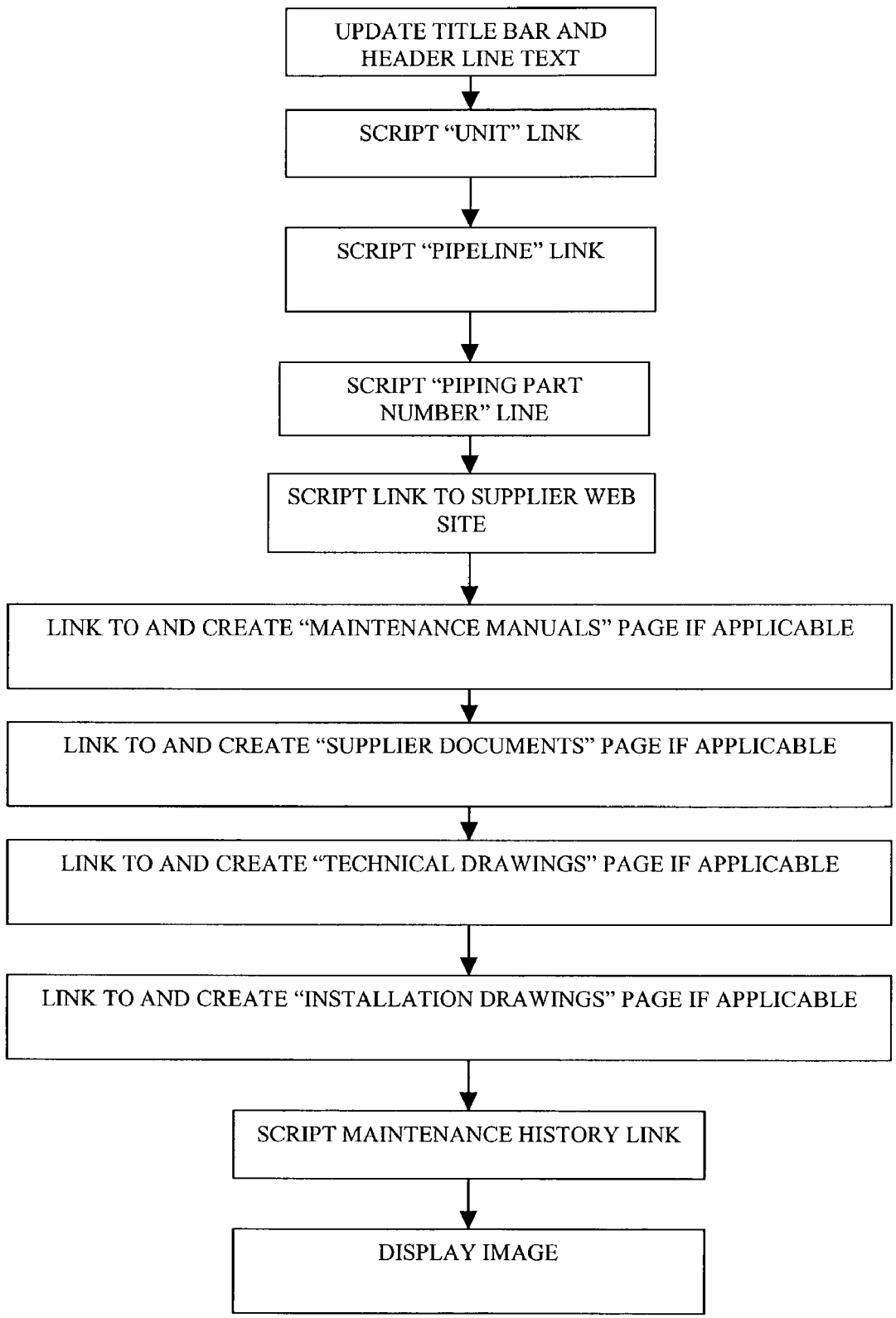
FIG. 27 is a flow diagram displaying the steps taken by the software to create a "Maintainable Piping Part" page.
Figure 28:
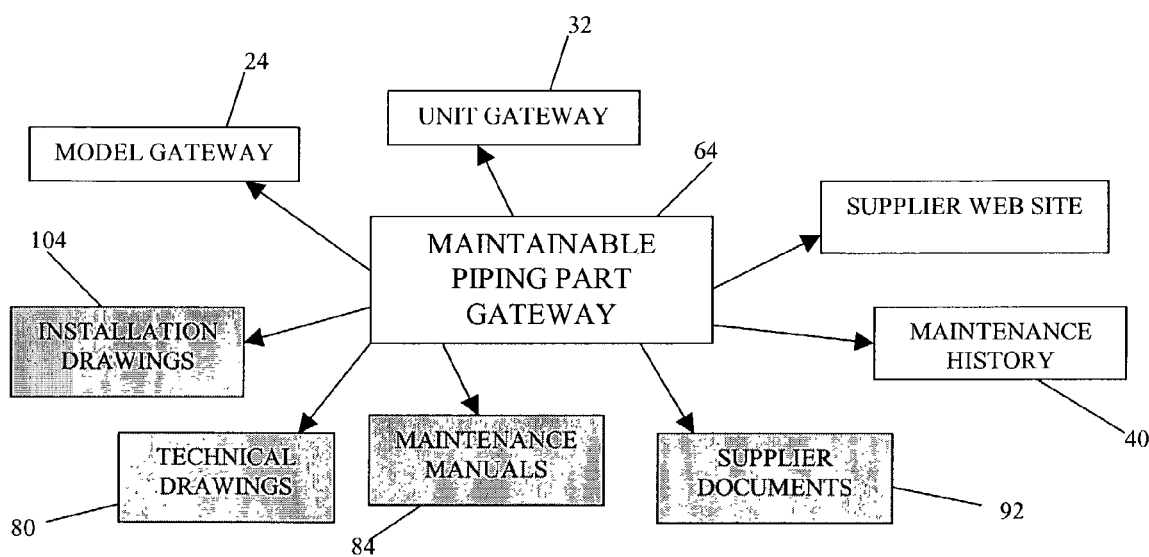

Referring to FIGS. 27 and 28, the following steps are taken by the software to create a "Maintainable Piping Part" gateway page 64 after the "Maintainable Piping Part" page generation functionality has been activated:

(1) The page's title bar and header line text are updated;

(2) The "Unit" link is scripted. This links back to the unit of which the piping part belongs. The software extracts the unit ID from the URL;

(3) The "Piping Line ID" link is scripted. This links back to the pipeline to which the piping part belongs. The software extracts the pipeline ID from the URL;

(4) The "Supplier" link is scripted. The software queries the database to determine the supplier and the supplier's web site;

(5) The "Maintenance Manuals" link is scripted. The database is queried to determine if any maintenance manuals exist. If maintenance manuals do exist, a link to a "Maintenance Manuals" document list page 84 is enabled. Then a document list page listing maintenance manuals is invoked. If no maintenance manuals exist, the link becomes an inactive or "null" link;

(6) The "Supplier Documents" link is scripted. The database is queried to determine if any supplier documents exist. If supplier documents do exist, a link to a "Supplier Documents" document list page 92 is enabled. Then a document list page listing supplier documents is created. If no supplier documents exist, the link becomes an inactive or "null" link;

(7) The "Technical Drawings" link is scripted. The database is queried to determine if any technical drawings exist. If technical drawings do exist, a link to a "Technical Drawings" document list page 80 is enabled. Then a document list page listing technical drawings is created. If no technical drawings exist, the link becomes an inactive or "null" link;

(8) The "Installation Drawings" link is scripted. The database is queried to determine if any installation drawings exist. If installation drawings do exist, a link to and "Installation Drawings" document list page 104 is enabled. Then a document list page listing installation drawings is created. If no installation drawings exist, the link becomes an inactive or "null" link;

(9) The "Maintenance History" link is scripted. This allows access to a database where maintenance history is documented. The end user can add or modify maintenance history information in this database; and

(10) The name and path of the image to appear on the web page is set.

Document List Pages

Figure 29:
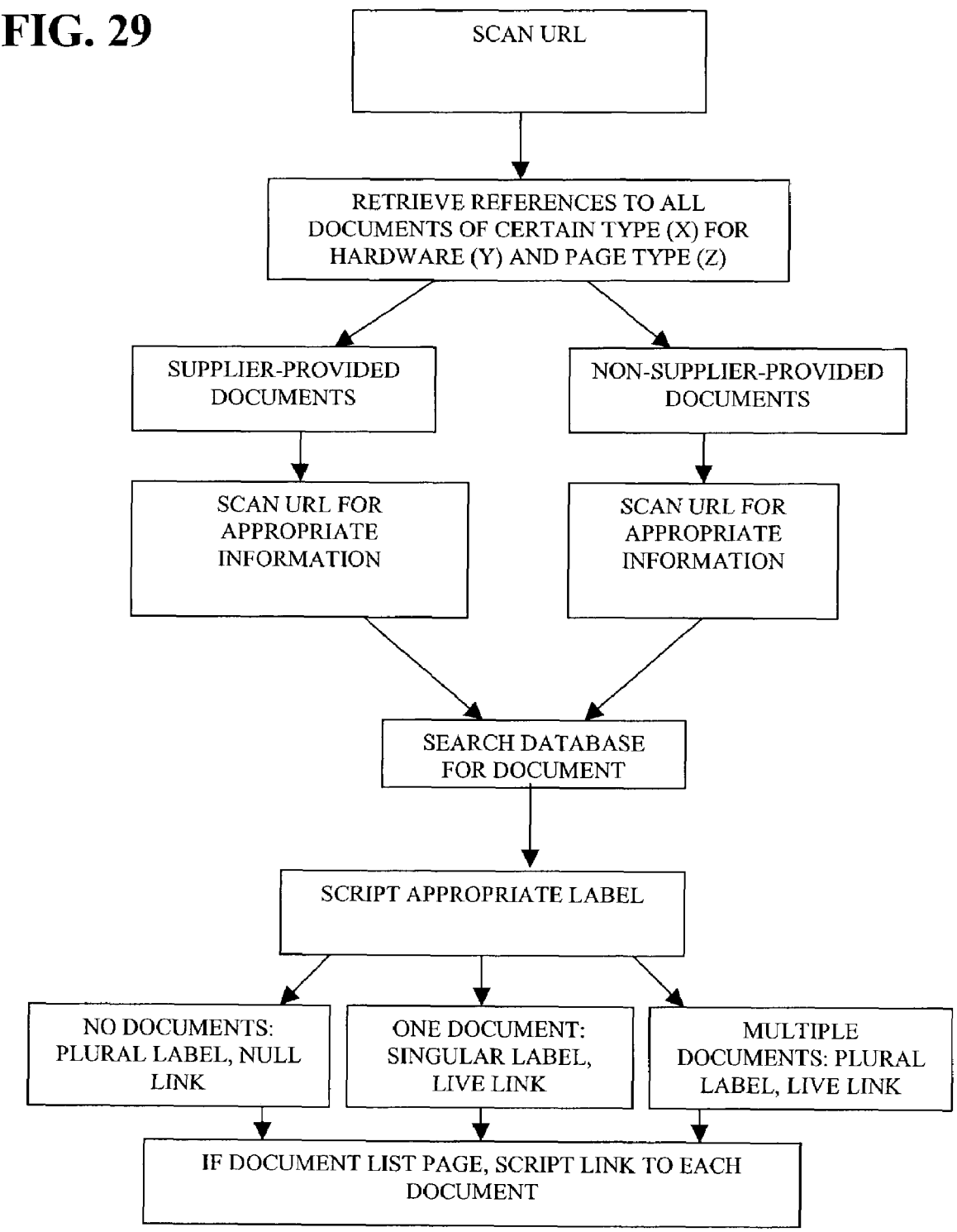
FIG. 29 is a flowchart displaying how relevant documents are found by the software.
Figure 30:
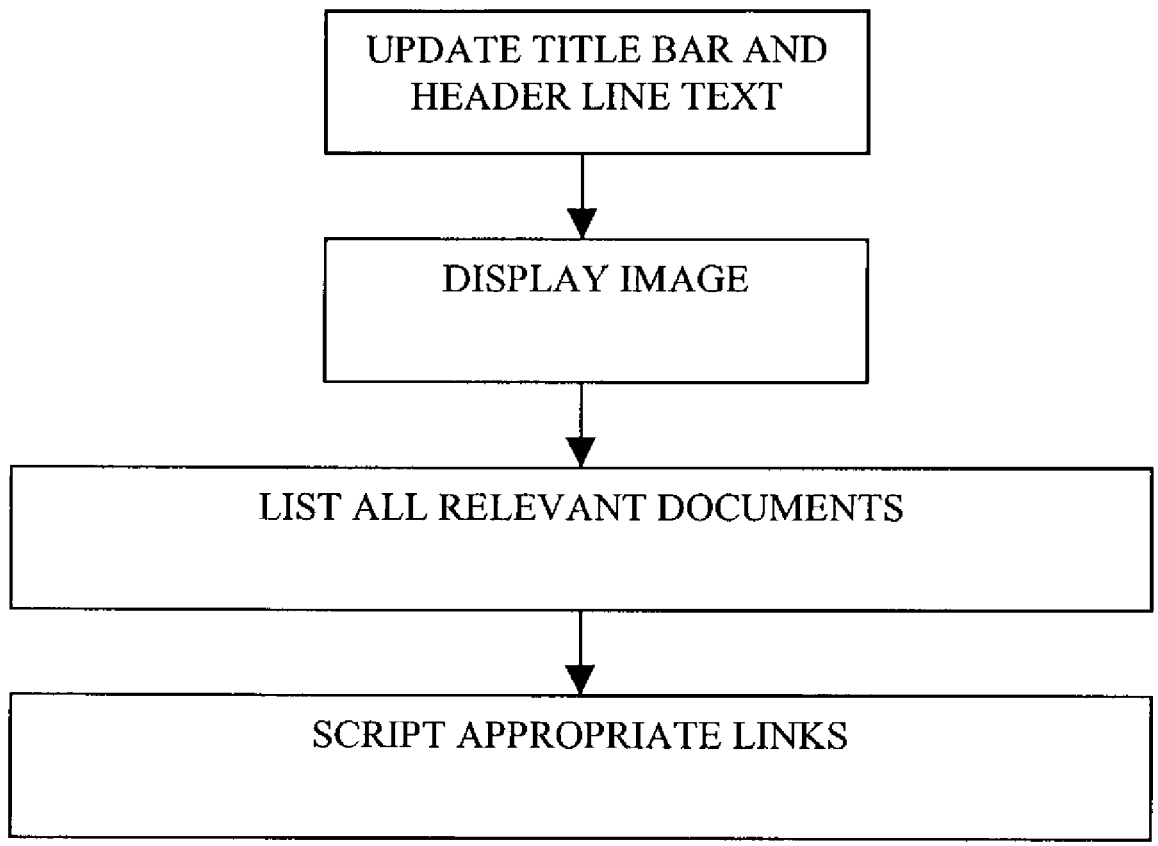
FIG. 30 is a flowchart displaying the steps generally taken to create a document list page.
Figure 31:
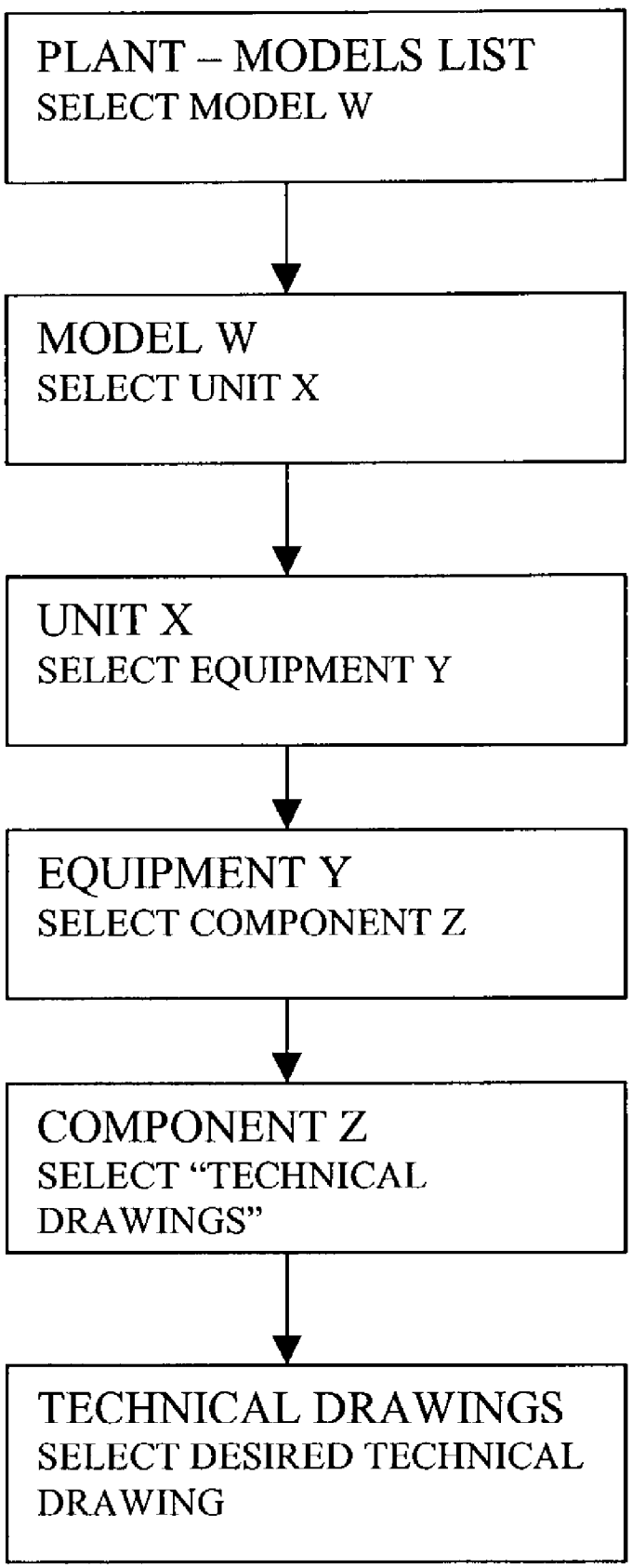
Figure 32:
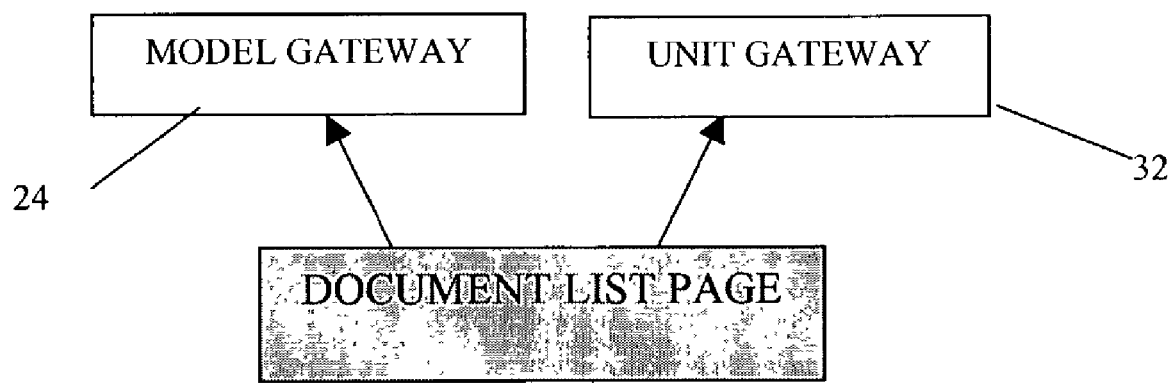
FIG. 32 is an example of navigating through the gateways.

The document list pages are all similarly created. Their creation is begun by the same page generation functionality of their parent web pages. For example, if a user would access the technical drawings document list page from a "Component" page 60, the same page generation functionality used to create the "Component" page 60 would be used to create the "Technical Drawings" document list page 80. The database is then queried to find the documents that should be placed on the document list page. A link is established for each document on the document list page. FIG. 29 is a flowchart displaying how relevant documents are found. FIG. 30 is a flowchart generally showing how the document list pages are created. FIG. 31 displays the pages that each document list page links to. As shown in FIG. 31, each document list page has a link back to the parent "Model" 24 and "Unit" 32 page from which the document list page was derived.

Referring to FIG. 29, determining whether there are relevant documents to be listed on a document list page or not will determine whether there is a singular, plural, or "null" link on the parent page. The steps the software takes to (1) determine whether there are relevant documents to be listed on a document list page or not, (2) create appropriate links on a parent page, and (3) create links for each document are the following:

(1) Scan the URL to search for information relevant to a certain document type. The URL will contain information such as the list label to be displayed, the file location, the document extension, and the name of the database table containing references to documents of the certain type;

(2) Compile the list of document associations for the certain document type, and begin to filter the results by looking for documents of the certain type (x) for a certain hardware ID (y) and a certain page type (z);

(3) Supplier provided document: Determine the supplier ID, the supplier hardware, the type of drawing, and the document extension that is desired by scanning the URL;

(3) Non-Supplier provided document: Determine the type of drawing and the document extension that is desired by scanning the URL;

(4) On the parent page script a label appropriate to the number of relevant documents found. If there are no relevant documents found, script a plural label ("Technical Drawings") with a null link on the parent page; a document list page will not be created. If there is one relevant document found, script a singular label ("Technical Drawings") with a live link. If there are more than one relevant documents found, script a plural label ("Technical Drawings") with a live link; and (5) On the document list page, script links to each relevant document.

Referring to FIG. 30, it can be seen that the document list pages are created similarly. First, the title page and header line text are updated. The software will then script the image that the document list page should display. The next step the software will take is to script links to each relevant document found. All of the document list pages except the "Plant—Reports List" page 28 find the relevant documents in the manner discussed above and shown on FIG. 29. A "Plant—Reports List" page 28 scans the XML file used to start the project to find the reports listed. Finally, the software will script links back to parent pages. All of the document list pages besides the "Plant—Reports List" page 28 will have links back to the parent model and unit page. The "Plant—Reports List" page 28 will only have a link back to the "Plant—Models List" page 20. It is possible for the "Technical Drawings" 80, "Maintenance Manuals" 84, "Purchase Orders" 88, and "Supplier Documents" 92 document list pages to have links to a "Pipeline" page 44. Whether or not they will have links back to a "Pipeline" page 44 will depend on the immediate parent page. The above listed document list pages will not have links to a "Pipeline" page 44 if their immediate parent page was either a "Component" 60 or "Equipment" page 36. The above listed document list pages will have a link to a "Pipeline" page 44 if their immediate parent page was either a "Pipeline" 44 or "Maintainable Piping Part" page 64. Furthermore, document list pages that list documents given from a supplier will have a link to the external supplier web site. The pages that include this link are the "Installation Drawings" 104, "Technical Drawings" 80, "Maintenance Manuals" 84, "Purchase Orders" 88, and "Supplier Documents" 92 document list pages.

Application of the Present Invention

FIG. 31 is an example of how a user would retrieve technical drawings while using the present invention in stand-alone form. The user would initiate the Digital Documentation and Maintenance System. A "Plant—Models List" page 20 will appear. The user will select the desired model of machinery (w) by selecting the appropriate link. After selecting the link, a "Models" page 24 will appear. The page will consist of an image of the selected model and a list of units of that model. The user will select the desired unit (x) by using the appropriate link. The user will be directed to a web page that contains a list of equipment that pertains to that unit. The user will select the appropriate equipment (y), and will be directed to an "Equipment" page 36. On the equipment page a list of all of the components of that piece of equipment (y) will appear. The user will select the desired component, and will be redirected to a "Component" page 60, which will contain a link to technical drawings. The user will select the technical drawings link and will be redirected to a web page containing links to various technical drawings. The user will select the appropriate technical drawing to view. This method of retrieving the technical drawing may take a minute, compared to the hours, days, or weeks it may take to retrieve the drawing otherwise.

Implementing the Present Invention with CATIA® and ENOVIA®

Figure 33:
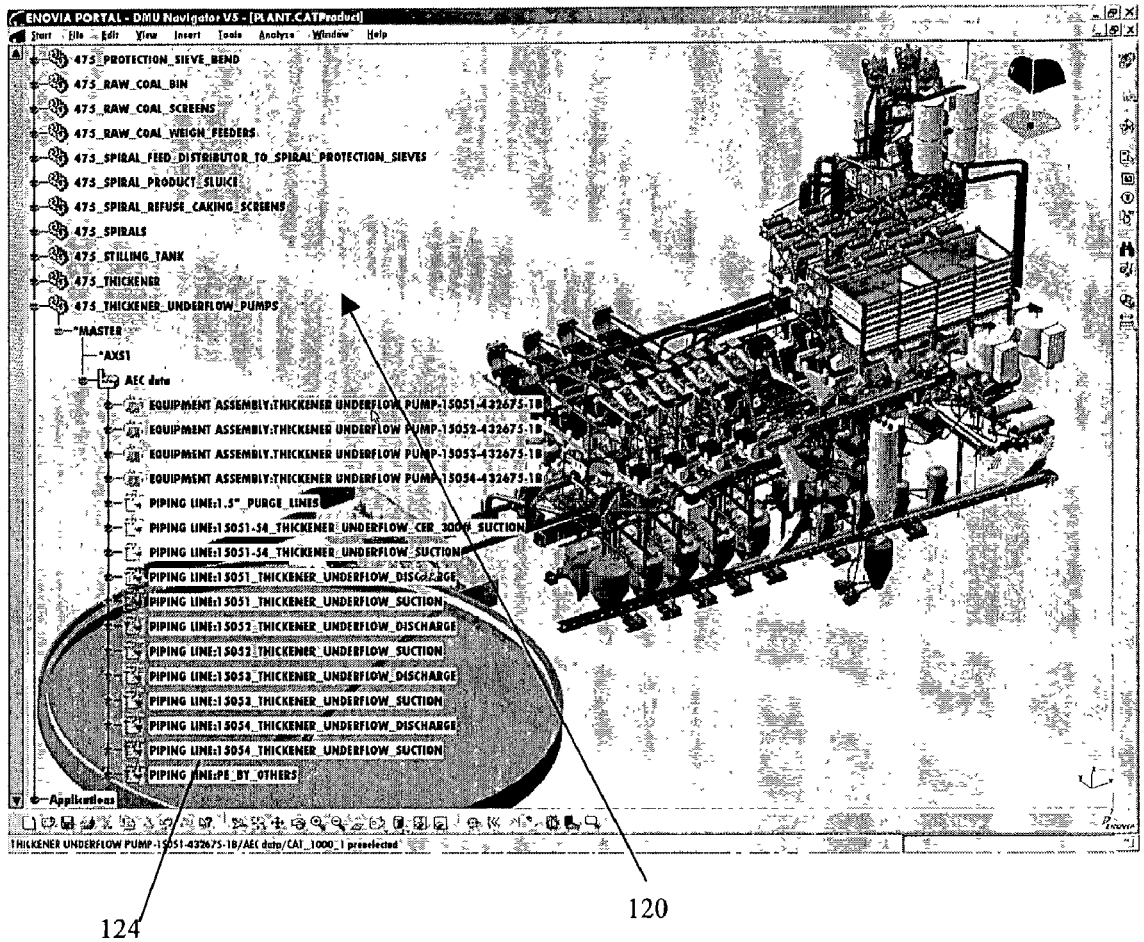
FIG. 33 is a diagram displaying a "tree" in ENOVIA®.

While the present preferred embodiment utilizes CATIA® and ENOVIA®, the present invention could use any CAD software that allows hyperlinks to be associated with design entities. CATIA® is a 3D design software, and ENOVIA® is a system that allows the linking of design items to the internet. CATIA® and ENOVIA® are generally sold and operated together. Operating CATIA® with ENOVIA® allows a user to associate entities in CATIA® with a "tree" 120 in ENOVIA®. FIG. 33 shows a "tree" 120 while operating CATIA® with ENOVIA®. In the preferred embodiment, the providers of the software would name the models, units, equipment, component, pipelines, etc. in ENOVIA® and associate those names with the design entities in CATIA®. Alternatively, a client could be trained to enter the names of the entities in ENOVIA® and associate those names with the design entities in CATIA®.

In the present preferred embodiment the person naming the design entities in ENOVIA® should organize them in the same manner as the gateways are organized. This would allow a user to navigate through the "tree" 120 in the same manner as the user would navigate through the gateways. A user can navigate through the "tree" 120 by expanding or contracting a single "tree node" 124 as is known in the art. If a "tree node" 124 has the capability of being expanded, the user can click on the "+" symbol to the left of the "tree node" 124. If a "tree node" 124 is already expanded, the user can click on the "−" sign and the "tree-node" 124 will be contracted. The method of expanding and contracting "tree nodes" 124 of a "tree" 120 is well known in the art of internet navigation.

Figure 34:
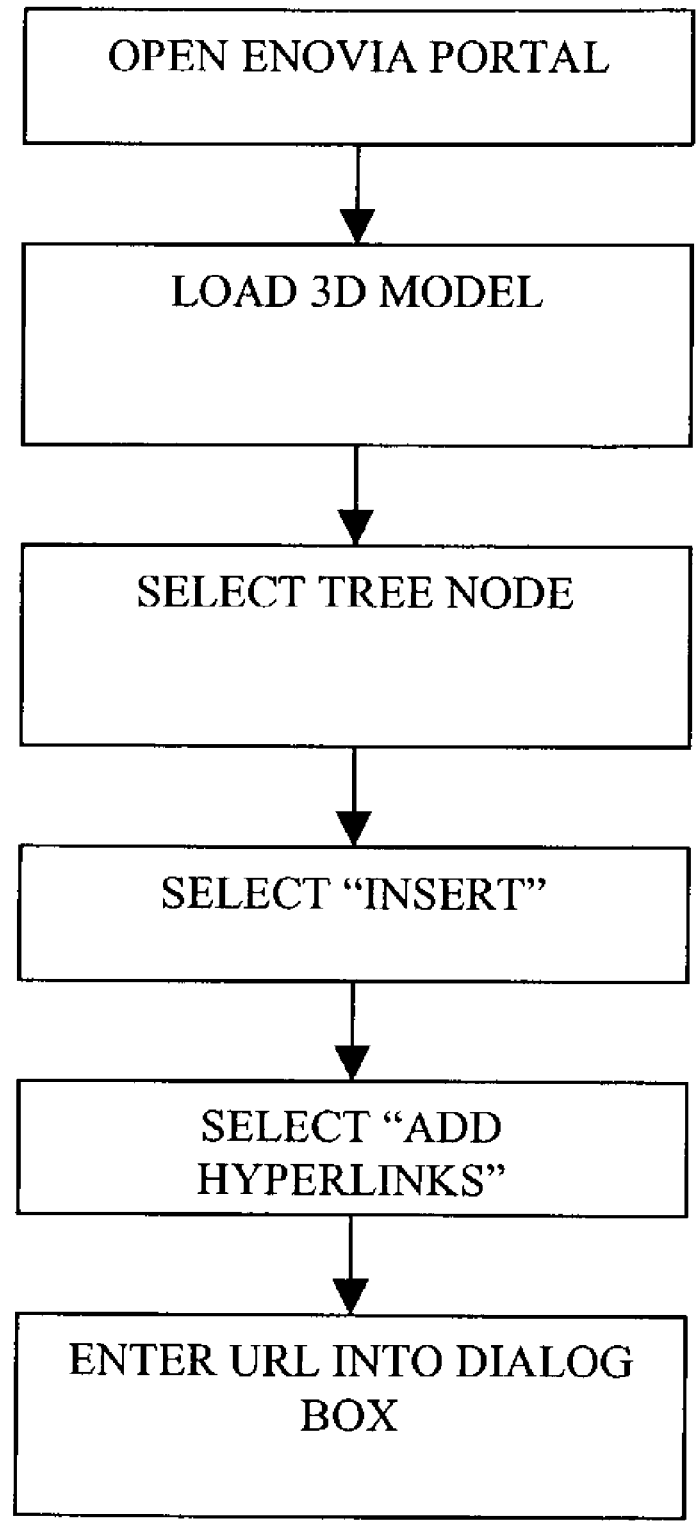
FIG. 34 is a method of adding hyperlinks in ENOVIA®.

To enable access from the "tree" 120 to a gateway page, hyperlinks must be added in ENOVIA®. FIG. 34 is a flowchart of a method of adding hyperlinks in ENOVIA® in conjunction with CATIA®:

(1) The user will open an ENOVIA® portal and load a 3D CATIA® model;

(2) The user will select the "tree node" from the "tree" that he wishes to associate with a gateway page;

(3) The user will pull down the "Insert" menu;

(4) From the menu listing the user will select "Add Hyperlinks"; and (5) A dialogue box requesting a URL will appear. The user will enter into the dialogue box the URL of the gateway page that he wishes to associate to the "tree node."

A hyperlink must be added to every "tree node" 124 that the user wishes to associate to a gateway page.

Figure 35:
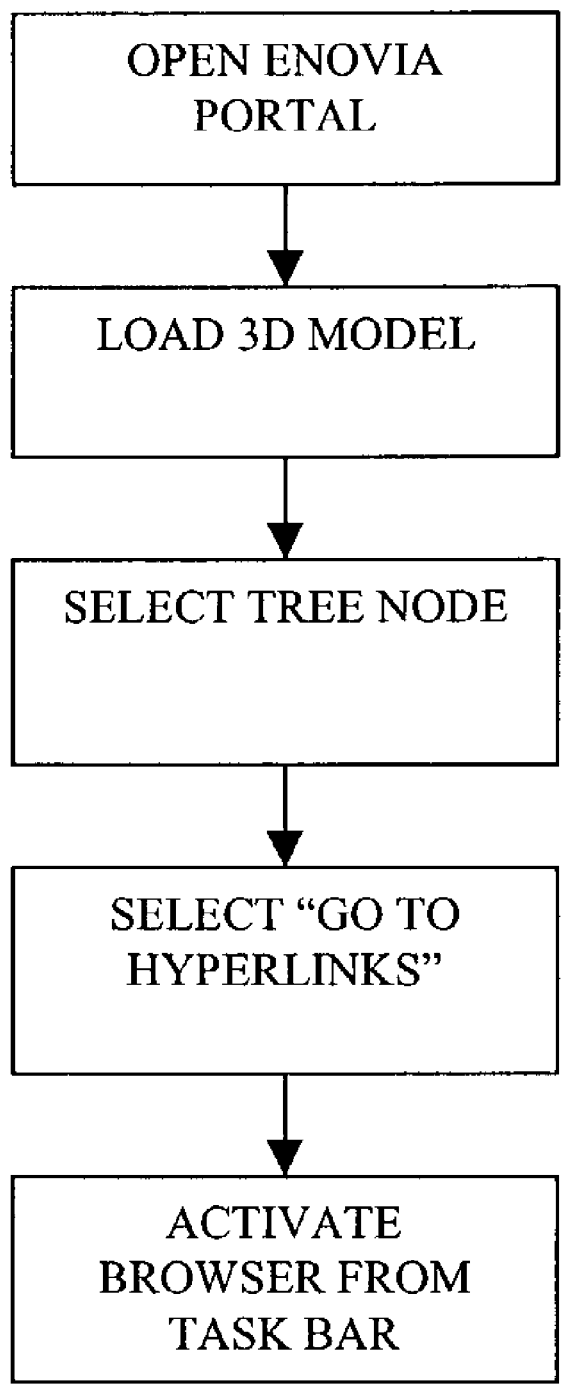
FIG. 35 is an example of accessing a hyperlink in ENOVIA®.

FIG. 35 displays a possible method of accessing the gateway pages through ENOVIA®. This method can only be used after all of the entities have been named in ENOVIA® and associated with entities in the 3D design, and after hyperlinks have been added in ENOVIA®. (1) The user will open an ENOVIA® portal and load a 3D CATIA® model; (2) the user will visually navigate through the plant design and select an entity; (3) an ENOVIA® "tree" 120 corresponding to the entity selected will appear; (4) the user will navigate through the "tree" 120 as desired; (5) the user will select a "tree node" 124 that is associated with a hyperlink; and (6) the user will select the "Go To Hyperlinks" button that appear on the right menu bar in the ENOVIA® portal. After those steps are taken, a gateway page associated with the hyperlink will be enacted. ENOVIA®, however, will reload and appear above the gateway page. The user must simply select the gateway page from the task bar at the bottom of the computer screen, which causes the gateway page to appear on top of the ENOVIA® portal. Once the gateway page appears, the invention will be used in the same manner as if used as a stand-alone invention.

While the above description identifies the present preferred embodiments, other possible modifications of the specifically described and illustrated features will be apparent to one skilled in the art and are intended to be encompassed within the present invention without departing from the scope thereof.

We claim:

1. A web-based plant document retrieval system, comprising:

a processor;

a hierarchy of components within a plant of a coal processing factory;

a database of documents and information related to the plant of the coal processing factory structured in accordance with said hierarchy;

a processor software application enters relevant information to identity function of each component into the database in an appropriate hierarchical location;

the processor software application creates a visual representation of the plant of the coal processing factory;

the processor software application creates a software tree whose nodes are corresponding to the hierarchy of components and sub-components of the plant of the coal processing factory;

the processor software application links nodes of the software tree and the visual representation to database stored entity information via Uniform Resource Locator (URL) strings created, where the linking maintains interrelationships between the components of the plant of the coal processing factory;

the processor software application dynamically creates a browser viewable web page for said URL strings by identifying a logical order for a browser viewable web page from information in the URL strings, the logical order defines relation of the browser viewable web page to other browser viewable web pages and a page generating function that interrelates data to a visual model using a plant identifier (ID), model identifier (ID), circuit identifier (ID), and unit identifier (ID);

the processor software application interrelates the web pages to one another in a manner corresponding to spatial relationship of the components and sub-components of the plant of the coal processing factory;

a digital visual model of the plant of the coal processing factory created using a digital photograph, where nodes of the software tree are assigned to plants within the model; and the processor software application links nodes of the software tree to the web pages containing identify and functional information relative to the nodes.

2. The system of claim 1, wherein the database is structured in a manner that enables a user, through the software application, to:

a) associate documents in the database with a corresponding plant; and b) create gateway and document list pages so that each page will contain information and links regarding a corresponding plant.

3. The system of claim 1, wherein the database documents include one or more of:

a) images of the plant;

b) technical drawings;

c) maintenance manuals;

d) assembly instructions;

e) field notes;

f) purchase orders;

g) elevation drawings;

h) supplier information;

i) fabrication drawings;

j) supplier web site locations;

k) plant component names and numbers;

l) associations between plant components; and m) maintenance history.

4. The system of claim 1, wherein the plant comprises one or more of the following:

a) a piece of machinery;

b) a component of a piece of machinery;

c) a piece of equipment;

d) a component of a piece of equipment;

e) a piping line associated with a processing plant;

f) a part of a piping line within a processing plant; and g) a plant entity.

5. The system of claim 1, wherein said web pages are arranged to link to each other in a hierarchical manner from a broad representation of a plant to a more specific plant component.

6. The system of claim 1, wherein the digital visual model is one of a computer-generated image or a digital photograph, and further wherein said at least one page will be displayed upon the selection by a user of a corresponding image within the model.

7. The system of claim 1, further comprising upon a selection of a plant with the model, the software tree will expand to display a node associated with the selected plant.

8. A method for creating a web-based plant document retrieval system, comprising steps of:

defining a hierarchy of components within a plant of a coal processing factory; creating a database of documents and information related to the plant of the coal processing factory;

structuring the database in accordance with the defined hierarchy;

entering relevant information to identity function of each component into the database in an appropriate hierarchical location;

creating a visual representation of the plant of the coal processing factory;

creating a software tree whose nodes are corresponding to the hierarchy of components and sub-components of the plant of the coal processing factory;

linking nodes of the software tree and the visual representation to the database stored entity information via Uniform Resource Locator (URL) strings created by a software application, where the linking maintains inter-relationships between the components of the plant of the coal processing factory;

dynamically creating a browser viewable web page for said URL strings by identifying a logical order for the browser viewable web page from information in the URL strings, the logical order defines relation of the browser viewable web page to other browser viewable web pages and a page generating function that interrelates data to a visual model using a plant identifier (ID), model identifier (ID), circuit identifier (ID), and unit identifier (ID);

interrelating the web pages to one another in a manner corresponding to spatial relationship of the components and sub-components of the plant of the coal processing factory;

creating a digital visual model of the plant of the coal processing factory using a computer-aided design software application or digital photograph;

assigning nodes of the software tree to plants within the model; and linking nodes of the software tree to the web pages containing identity and functional information relative to said nodes.

9. The method of claim 8, wherein at least one of the pages created is a gateway page.

10. The method of claim 8, wherein at least one of the pages created is a document list page.

11. The method of claim 8, wherein said linking further comprises:

creating identification of the plant comprising the visual representation; and referencing pages in the software application with the identification of the plant in visual representation.

* * * * *